US010823576B2

(12) United States Patent
Rombouts et al.

(10) Patent No.: US 10,823,576 B2
(45) Date of Patent: Nov. 3, 2020

(54) SYSTEMS AND METHODS FOR ROBOTIC MAPPING

(71) Applicant: BRAIN CORPORATION, San Diego, CA (US)

(72) Inventors: Jaldert Rombouts, San Diego, CA (US); Borja Ibarz Gabardos, London (GB); Jean-Baptiste Passot, Solana Beach, CA (US); Andrew Smith, San Diego, CA (US)

(73) Assignee: Brain Corporation, San Diego, CA (US)

(*) Notice: Subject to any disclaimer, the term of this patent is extended or adjusted under 35 U.S.C. 154(b) by 0 days.

(21) Appl. No.: 16/356,160

(22) Filed: Mar. 18, 2019

(65) Prior Publication Data
US 2019/0249998 A1 Aug. 15, 2019

Related U.S. Application Data

(63) Continuation of application No. 15/340,807, filed on Nov. 1, 2016, now Pat. No. 10,274,325.

(51) Int. Cl.
*G01C 21/32* (2006.01)
*G01S 17/89* (2020.01)
*G01S 15/89* (2006.01)

(52) U.S. Cl.
CPC ............. *G01C 21/32* (2013.01); *G01S 17/89* (2013.01); *G01S 15/89* (2013.01)

(58) Field of Classification Search
CPC .. G05D 1/0225; G05D 1/0272; G05D 1/0274; G05D 1/0246; G05D 1/0234; G05D 2201/0215; G05D 2201/0207; G05D 2201/0203; A47L 9/2873; A47L 2201/02; B25J 9/0003; B25J 9/0005; Y10S 901/01
See application file for complete search history.

(56) References Cited

U.S. PATENT DOCUMENTS

| 2012/0219207 A1* | 8/2012 | Shin ..................... B25J 9/162 382/153 |
| 2013/0216098 A1* | 8/2013 | Hasegawa ............ G05D 1/0274 382/103 |
| 2014/0129027 A1* | 5/2014 | Schnittman .......... G05D 1/0219 700/253 |
| 2016/0271795 A1* | 9/2016 | Vicenti .................... B25J 9/163 |
| 2017/0102709 A1* | 4/2017 | Kwak .................. A47L 11/4011 |
| 2018/0038697 A1* | 2/2018 | Li ......................... G01C 21/206 |

* cited by examiner

*Primary Examiner* — Dale Moyer
(74) *Attorney, Agent, or Firm* — Reed Smith LLP; Sidharth Kapoor

(57) ABSTRACT

Systems and methods for robotic mapping are disclosed. In some exemplary implementations, a robot can travel in an environment. From travelling in the environment, the robot can create a graph comprising a plurality of nodes, wherein each node corresponds to a scan taken by a sensor of the robot at a location in the environment. In some exemplary implementations, the robot can generate a map of the environment from the graph. In some cases, to facilitate map generation, the robot can constrain the graph to start and end at a substantially similar location. The robot can also perform scan matching on extended scan groups, determined from identifying overlap between scans, to further determine the location of features in a map.

36 Claims, 16 Drawing Sheets

SYSTEMS AND METHODS FOR ROBOTIC MAPPING

CROSS-REFERENCE AND RELATED APPLICATIONS

This application is a continuation of U.S. patent application Ser. No. 15/340,807, filed Nov. 1, 2016, and is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems and methods for robotic mapping.

Background

In some cases, robots map an environment. These maps enable the robot to navigate autonomously. As the robot maps its environment, it relies on its senses (e.g., using sensors) to detect features of the environment and remember those features for later reference. However, mapping can be a slow and difficult process due to, among other things environmental noise, sensor noise and inaccuracy, ambiguities in the environment (e.g., substantially similar features), sensor drift, and other issues.

Inaccuracies in mapping can cause a robot to get lost during navigation or become unable to navigate an environment at all. In some cases, mapping issues can cause a robot to collide with objects or people in an environment, or fail to accomplish the objective the robot was tasked to do. As a result, there is need in the art to develop systems and methods that can correct for inaccuracies in mapping and generate a map that represents the environment and/or the route traveled by the robot.

As a further challenge, it is often desirable for robots to be affordable, lightweight, and as small as possible. Accordingly, it is desirable for systems and methods to be computationally efficient and capable of running on low cost (e.g., possibly less accurate) hardware, including sensors and processors.

SUMMARY

The foregoing needs are satisfied by the present disclosure, which provides for, inter alia, apparatus and methods for mapping in autonomous navigation. Example implementations described herein have innovative features, no single one of which is indispensable or solely responsible for their desirable attributes. Without limiting the scope of the claims, some of the advantageous features will now be summarized.

In a first aspect, a method of generating a map by a robot is disclosed. In one exemplary implementation, the method includes traveling, by the robot in an environment, creating a graph comprising a plurality of nodes, wherein each node corresponds to a scan taken by a sensor of the robot at a location in the environment, constraining the graph to start and end at a substantially similar location; performing scan matching on extended scan groups determined at least in part from groups of the plurality of nodes, associating a range of possible locations with each of the plurality of nodes based at least in part on the scan matching; determining confidences associated with each range of possible locations, optimizing the graph to find the likely location of the plurality of nodes based at least in part on the confidences; and rendering the map from the optimized graph.

In one variant, the generation of the map comprises ray tracing with the scans taken by the sensor, the scans associated with the plurality of nodes. In another variant, optimizing the graph comprises: generating a cost function based at least in part on (1) relative locations of each of the plurality of nodes and (2) the confidences associated with each of the plurality of nodes, and solving the cost function for a minimum.

In another variant, constraining the graph to start and end at the substantially similar location further comprises constraining the graph to start and end in view of a home locator. In another variant, traveling in an environment comprises navigating under user control.

In another variant, the associated confidences further comprise using a probability distribution indicative at least in part of a probability that a given node is in a given location.

In another variant, the extended scan groups determined at least in pan from groups of the plurality of nodes further comprise selecting a root node as a reference location, finding possible overlaps in measurements of distinct features in scans taken at other nodes, and grouping the other nodes into extended scan groups based at least in part on overlapping distinct features of the scans at those respective other nodes.

In a second aspect, a robot is disclosed. In one exemplary implementation, the robot includes: a sensor configured to take scans of an environment at nodes, wherein each node is associated with a location; and a mapping and localization unit configured to: create a graph of the nodes based at least in part on the taken scans, determine extended scan groups based at least in part on groups of the plurality of nodes, and perform scan matching on the extended scan groups.

In one variant, the mapping and localization unit is further configured to constrain the graph to start and end at a substantially similar location. In another variant, the mapping and localization unit is further configured to determine confidences associated with the location of each node.

In another variant, the mapping and localization unit is further configured to generate a cost function based at least in part on the confidences and locations of each node, wherein the mapping and localization unit determines the location of each node in the graph based on solving the cost function for a minimum.

In another variant, the processor is further configured to render a map from the graph, the map rendered based at least in part on ray tracings of the scans.

In another variant, the robot further includes an actuator configured to move the robot between locations. In another variant, the robot further includes a user interface configured for user control of the robot.

In another variant, the robot further includes a navigation unit configured to navigate the robot autonomously.

In a third aspect, a non-transitory computer-readable storage apparatus is disclosed. In one embodiment, the non-transitory computer-readable storage apparatus has a plurality of instructions stored thereon, the instructions being executable by a processing apparatus to operate a robot. The instructions are configured to, when executed by the processing apparatus, cause a sensor to generate scans of an environment at a plurality of nodes, wherein each node of the plurality is associated with a location; create a graph of the plurality of nodes based on the generated scans; determine extended scan groups based at least in part from scans associated with groups of the plurality of nodes, and perform scan matching on the extended scan groups.

In one variant, the instructions further cause the processing apparatus to constrain the graph to start and end at a substantially similar location.

In another variant, each extended scan group comprises three or more scans.

In another variant, the instructions further cause the processing apparatus to determine a cost function based at least in part on confidences of the location of each node.

In another variant, the instructions further cause the processing apparatus to generate a map based at least in part on minimizing the cost function.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

All Figures disclosed herein are © Copyright 2016 Brain Corporation. All rights reserved.

DETAILED DESCRIPTION

Various aspects of the novel systems, apparatuses, and methods disclosed herein are described more fully hereinafter with reference to the accompanying drawings. This disclosure can, however, be embodied in many different forms and not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of, or combined with, any other aspect of the disclosure. For example, an apparatus can be implemented or a method can be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein can be implemented by one or more elements of a claim.

Although particular aspects are described herein, many variations and permutations of these aspects all within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for improved systems and methods for robotic mapping. As used herein, a robot can include mechanical or virtual entities configured to carry out complex series of actions automatically. In some cases, robots can be machines that are guided by computer programs or electronic circuitry. In some cases, robots can include electro-mechanical components that are configured for navigation, where the robot can move from one location to another. Such navigating robots can include autonomous cars, floor cleaners, rovers, drones, cans, and the like.

As referred to herein, floor cleaners can include floor cleaners that are manually controlled (e.g., driven or remote control) and/or autonomous (e.g., using little to no user control). For example, floor cleaners can include floor scrubbers that a janitor, custodian, or other person operates and/or robotic floor scrubbers that autonomously navigate and for clean an environment. Similarly, floor cleaners can also include vacuums, steamers, buffers, mop, polishers, sweepers, burnishers, etc.

Figure 1:
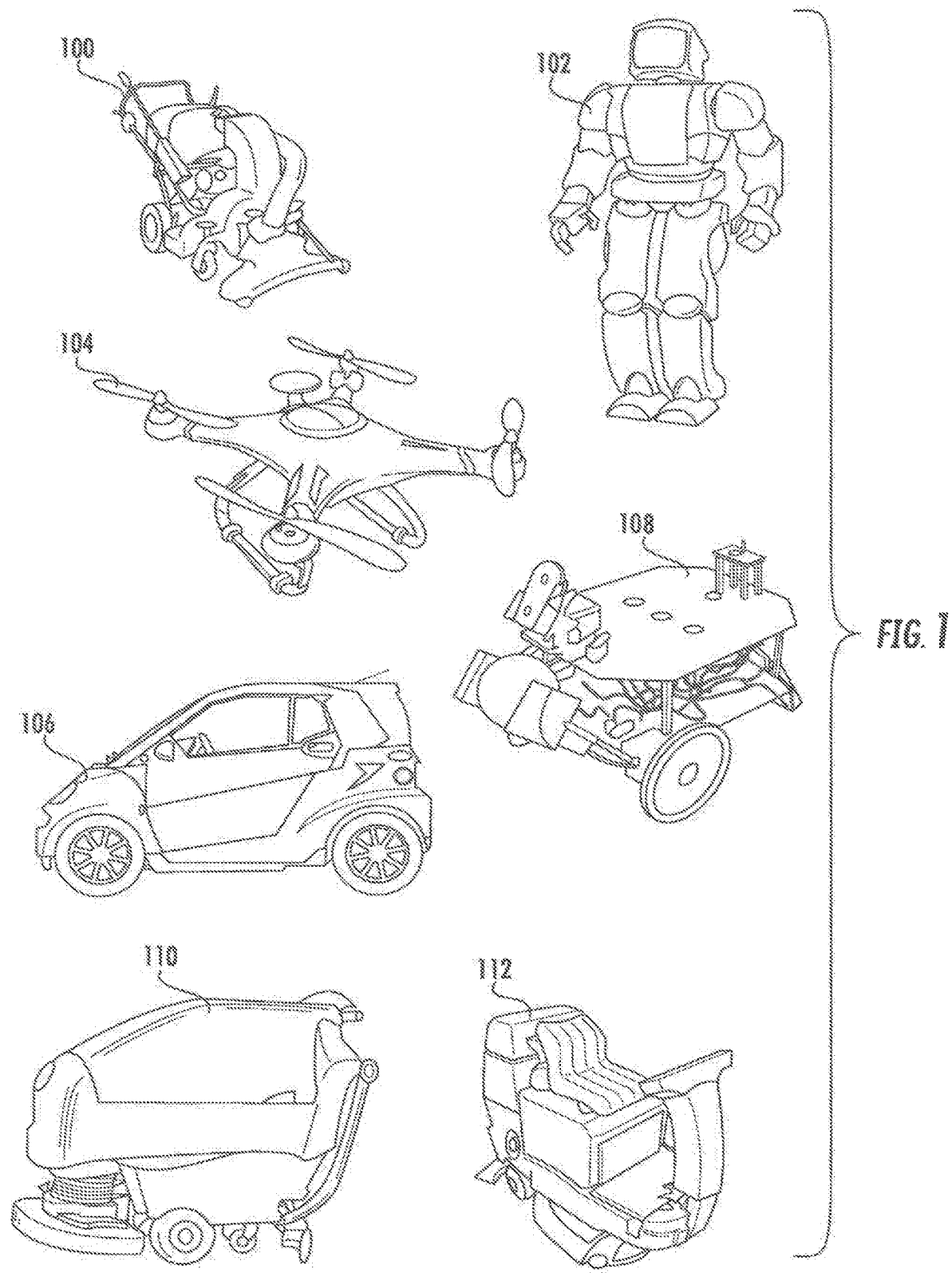
FIG. 1 illustrates various side elevation views of exemplary body forms for a robot in accordance with principles of the present disclosure.

A person having ordinary skill in the art would appreciate that a robot, as referred to herein, can, have a number of different appearances/forms. FIG. 1 illustrates various side elevation views of exemplary body forms for a robot in accordance with principles of the present disclosure. These are non-limiting examples meant to further illustrate the variety of body forms, but not to restrict robots described herein to any particular body form. For example, body form 100 illustrates an example where the robot is a stand-up shop vacuum. Body form 102 illustrates an example where the robot is a humanoid robot heaving an appearance substantially similar to a human body. Body form 104 illustrates an example where the robot is a drone having propellers. Body form 106 illustrates an example where the robot has a vehicle shape having wheels and a passenger cabin. Body form 108 illustrates an example where the robot is a rover.

Body form 110 can be an example where the robot is a motorized floor scrubber. Body form 112 can be a motorized floor scrubber having a seat, pedals, and a steering wheel, where a user can drive body form 112 like a vehicle as body form 112 cleans, however, body form 112 can also operate autonomously. Other body forms are further contemplated, including industrial machines that can be robotized, such as forklifts, tugs, boats, planes, etc.

Detailed descriptions of the various implementations and variants of the system and methods of the disclosure are now provided. While many examples discussed herein are in the context of robotic floor cleaners, it will be appreciated that the described systems and methods contained herein ran be used in other robots. Myriad other example implementations or uses for the technology described herein would be readily envisaged by those having ordinary skill in the art, given the contents of the present disclosure.

Advantageously, the systems and methods of this disclosure at least: (i) provide for accurate route and/or environment mapping by a robot; (ii) provide computational efficiency which can reduce consumption of processing power, energy, and/or other resources in navigating robots; and (iii) allow use of lower-cost hardware in construction of robots. Other advantages readily discernable by one having ordinary skill given the contents of the present disclosure.

For example, many current robots that can autonomously navigate are programmed to navigate routes and/or paths to goals. In order to navigate these routes and/or paths, these robots can create maps, which can sometimes be referred to as a global solution in that the maps identify one or more portions of the environment beyond what a robot can directly observe with its sensors at a point in time. These robots generate maps, and their relationship to the environment along routes, using localized detection in a small area around the robot (e.g., in the order of a few meters), where the robot can determine obstacles and/or other features detected by its sensors. When navigating autonomously, robots can then utilize both the global solution and localized detection of objects to avoid collisions and/or reach its goal.

By way of illustration robot (e.g., floor cleaner, autonomous vehicle, or other robot) can be programmed by demonstration. In the example of a floor cleaner, an operator can control the robot along a desired route in a desired environment. Accordingly, the robot can generate a map, documenting its location (e.g., place on the global map and/or pose relative to features of the environment) while the operator controls it. The robot can generate the map using odometry and its sensors (e.g., scans by a Light Detecting and Ranging ("LIDAR") sensor and/or any other sensor that is described in this disclosure). Subsequently, the robot can navigate the route autonomously, e.g., with little to no operator control.

A challenge for the robot in this illustration is constructing an accurate map that the robot can utilize to autonomously navigate the route after demonstration. The demonstration process can include complex sets of movements and actions (e.g. turning, stopping, parking, turning on and off blinkers and other signals, lifting and dropping brushes, turning off and on water flow, turning off and on vacuums, etc.) associated with particular poses and/or trajectories, is well as identification of objects. During the demonstration, the robot's mapping not be perfectly accurate (e.g., subject to drift, noise, and/or error), and the robot may need to determine how the map should have appeared to accurately reflect the true state of the environment.

Figure 2:
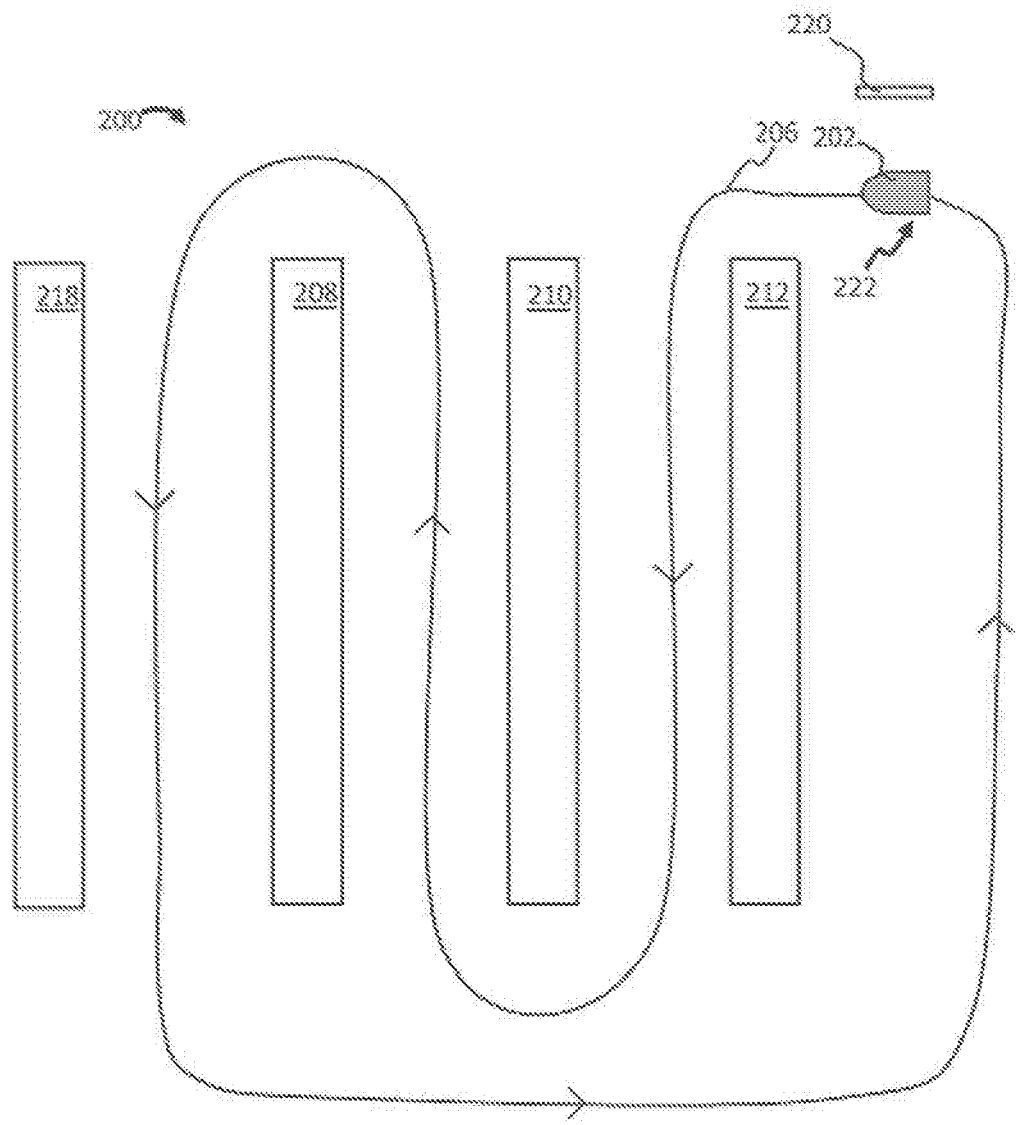
FIG. 2 is a diagram of an overhead view of a robot as an operator demonstrated a path in accordance with some implementations of this disclosure.

FIG. 2 is a diagram of an overhead view of robot 202 as an operator demonstrated a path in accordance with some implementations of this disclosure. In this way, FIG. 2 can illustrate the path robot 202 actually travels in an environment 200 while it is mapping. Robot 202 can be any robot described in this disclosure. By way of illustration, robot 202 can be a robotic floor cleaner, such as a robotic floor scrubber, vacuums, steamers, buffers, mop, polishers, sweepers, burnishers, and the like. Environment 200 can be the space in which robot 202 navigates. In the example of a robotic floor cleaner, the environment 200 can be a space having floors desired to be cleaned. For example, environment 200 can be a store, warehouse, office building, home, storage facility, etc. One or more of objects 208, 210, 218 can be shelves, displays, objects, items, people, animals, or any other entity or thing that may be on the floor or otherwise impede the ability of robot 202 to navigate through environment 200. As such, route 206 can be the cleaning path traveled by robot 202. Route 206 can follow a path that weaves between objects 208, 210, 212, and 218 as illustrated in example route 206. For example, where objects 208, 210, 212 and 218 are shelves in a store, robot 202 can go along the aisles of the store and clean the floors of the aisles. However, other routes are contemplated, such as, without limitation, weaving back and forth along open floor areas and/or any cleaning path a user could use to clean the floor (e.g., if the user is manually operating a floor cleaner). Accordingly, route 206 is meant merely as illustrative examples and can appear differently as illustrated. Also, as illustrated, one example of environment 200 is shown, however, it should be appreciated that environment 200 can take on any number of forms and arrangements (e.g., of any size, configuration, and/or layout of a room and/or building) and is not limited by the example illustrations of this disclosure.

In route 206, robot 202 can begin at the initial location 222, which can be the starting point/location of robot 202. In some cases, home locator 220 can be positioned near, substantially near, and/or at the initial location 222. For example, home locator 220 can be positioned adjacent to initial location 222, or be within the range of at least one sensor of robot 202 such that a sensor of robot 202 can detect home locator 220 from initial location 222. The operator can then demonstrate route 206 to robot 202 until robot 202 reaches an end location, where the operator can stop operating robot 202. The end location can be designated by a user and/or determined by robot 202. In some cases, the end location can be the location in route 206 after which robot 202 has cleaned the desired area of a floor. As previously described, route 206 can be a closed loop or an open loop. By way of illustrative example, an end location can be a location for storage for robot 202, such as a temporary parking spot storage room/closet, and the like. In some cases, the end location can be the point where a user training and/or programming tasks for robot 202. In some cases, the end location can be the same and/or substantially similar as initial location 222. For example, robot 202 can detect a return to a position that is the same and/or substantially similar to initial location 222 by detecting home location 220.

In the context of floor cleaners (e.g., floor scrubbers, vacuum cleaners, etc.), robot 202 may not clean at every point along route 206. By way of illustration, where robot 202 is a robotic floor scrubber, the cleaning system (e.g., water flow, cleaning brushes, etc.) robot 202 may only be operating in some portions of route 206 and not others. For example, robot 202 may associate certain actions (e.g., turning, turning on/off water, spraying water, turning on/off vacuums, moving vacuum hose positions, gesticulating an arm raising/lowering a lift, moving a sensor, turning on/off a sensor, etc.) with particular positions and/or trajectories (e.g., while moving in a certain direction or in a particular sequence along route 206) along the demonstrated route. In the context of floor cleaners, such association may be desirable when only some areas of the floor are to be cleaned but not others and/or in some trajectories. In such cases, robot 202 can turn on a cleaning system in areas where a user demonstrated for robot 202 to clean, and turn of the cleaning system otherwise.

Figure 3:
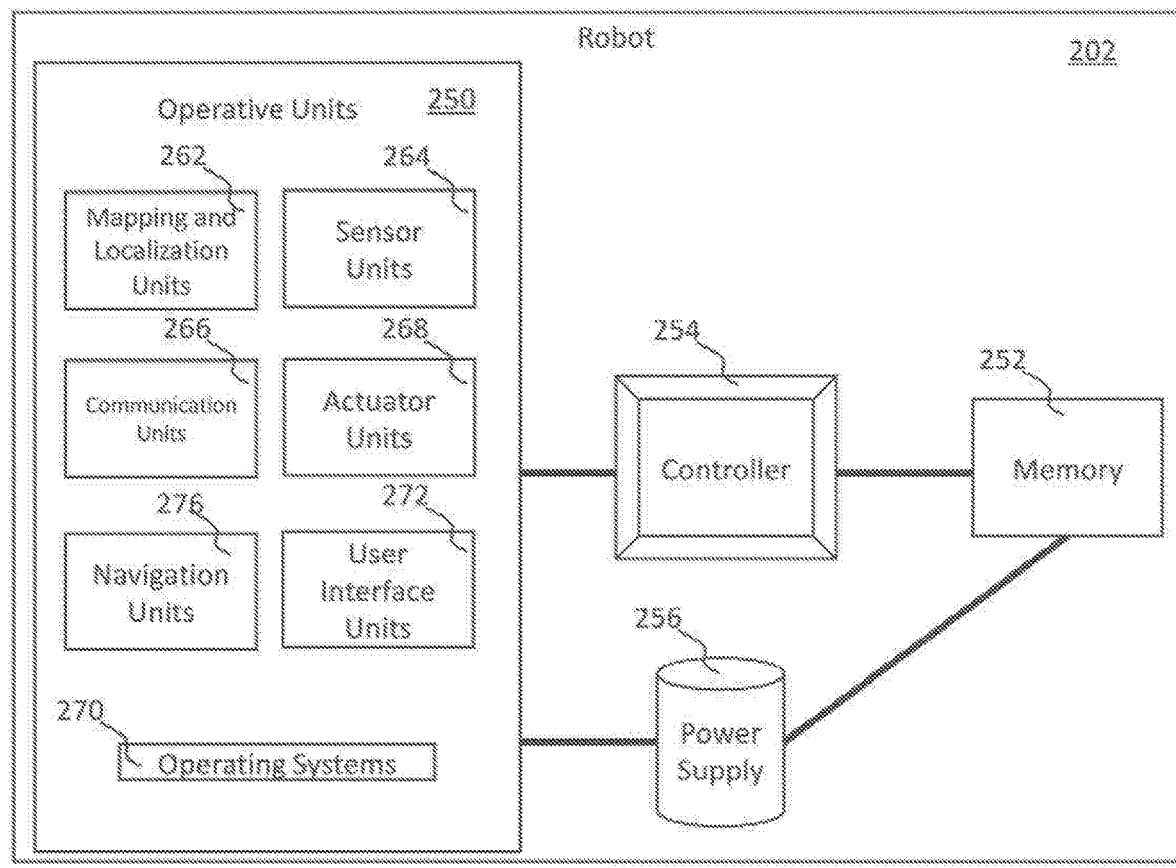
FIG. 3 illustrates a functional block diagram of an example robot in some implementations.

FIG. 3 illustrates a functional block diagram of example robot 202 in some implementations. As illustrated, robot 202 includes controller 254, memory 252, power supply 256, and operative units 250, each of which can be operatively and/or communicatively coupled to each other and each other's components and/or subcomponents. Controller 254 controls the various operations performed by robot 202. Although a specific implementation is illustrated in FIG. 3, the architecture may be varied in certain implementations as would be readily apparent to one of ordinary skill given the contents of the present disclosure.

Controller 254 can include one or more processors (e.g., microprocessors) and other peripherals. As used herein, the terms processor, microprocessor, and digital processor can include any type of digital processing devices such as, without limitation, digital signal processors ("DSPs"), reduced instruction set computers ("RISC") general-purpose ("CISC") processors, microprocessors, gate arrays (e.g., field programmable gate arrays ("FPGAs")), programmable logic device ("PLDs"), reconfigurable computer fabrics ("RCFs"), array processors, secure microprocessors, and application-Specific integrated circuits ("ASICs"). Such digital processors may be contained on a single unitary integrated circuit die, or distributed across multiple components.

Controller 254 can be operatively and/or communicatively coupled to memory 252. Memory 252 can include any type of integrated circuit or other storage device adapted storing digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM") extended data output RAM ("EDO") fast page mode ("FPM") RAM, reduced latency DRAM ("RLDRAM"), static RAM ("SRAM"), flash memory (e.g., NAND/NOR), memristor memory, pseudostatic RAM ("PSRAM"), etc. Memory 252 can provide instructions and data to controller 254. For example, memory 252 can be a non-transitory, computer-readable storage medium having a plurality of instructions stored, thereon, the instructions being executable by a processing apparatus (e.g., controller 254) to operate robot 202. In some cases, the instructions can be configured to executed by the processing apparatus, cause the processing apparatus to perform the various methods, features, and/or functionality described in this disclosure. Accordingly, controller 254 can perform logical and arithmetic operations based on program instructions stored within memory 252.

Operative units 250 can be coupled to controller 254, or any other controller, to perform the various operations described in this disclosure. One or more, or none, of the modules in operative units 250 can be included in some implementations. Throughout this disclosure, reference may be made to various controllers and/or processors. In some implementations, a single controller (e.g., controller 254) can sort as the various controllers and/or processors described. In other implementations, different controllers and/or processors can be used, such as controllers and/or processors used particularly for, and/or as part of, one of more of operative units 250. Controller 254 can send and/or receive signals, such as power signals, control signals, sensor signals, interrogatory signals, status signals, data signals, electrical signals and/or any other desirable signals, including discrete and analog signals to operative unite 250. Controller 254 can coordinate and/or manage operative units 250, and/or set timings (e.g., synchronously or asynchronously), turn on/off, control power budgets, receive/send network instructions and/or updates, update firmware, send interrogatory signals, receive and/or send statuses, and/or perform any operations for running features of robot 202.

Operative units 250 can include various units that perform functions for robot 202. For example, units of operative units 250 can include mapping and localization units 262, sensor units 264, actuator units 268, communication units 266, navigation units 276, and user interface units 272. Operative units 250 can also comprise other units that provide the various functionality of robot 202. In some cases, the units of operative units 250 can be instantiated in software or hardware and/or both software and hardware. For example, in some cases, units of operative units 250 can comprise computer-implemented instructions executed by a controller. In some cases, units of operative units 250 can comprise hardcoded logic. In some cases, units of operative units 250 can comprise both computer-implemented instructions executed by a controller and hardcoded logic. Where operative units 250 are implemented at least in part in software, operative units 250 can include units/modules of code configured to provide one or more functionalities.

In some implementations, sensor units 264 can comprise systems that can detect characteristics within and/or around robot 202. Sensor unite 264 can include sensors that are internal to robot 202 or external, and/or have components that are partially internal and/or partially external. Sensors unit 314 can include exteroceptive sensors such as sonar, LIDAR, radar, lasers, video cameras, infrared cameras, 3D sensors, 3D cameras, and/or any other sensor known in the art. Sensor units 264 can also include proprioceptive sensors, such as accelerometers, inertial measurement units, odometers, gyroscopes, speedometers, and/or the like. In some implementations, sensor units 264 can collect raw measurements (e.g., currents, voltages, resistances gate logic, etc.) and/or transformed measurements (e.g., distances, angles, detected points in obstacles, etc.).

In some implementations, mapping and localization units 262 can include systems and methods that can computationally construct and update maps (e.g., maps 300, and 400 as will be described with reference to FIGS. 4A and 4B, and/or any other map created by robot 202) of an environment and/or routes as robot 202 navigates the environment. By way of illustrative example, mapping and localization units 262 can map environment 200 and localize robot 202 (e.g., find the position and/or pose) in map 300 at one or more points in time. At the same time, mapping and localization units 262 can record a demonstrated route in map 300 (e.g., mapped route 306).

Mapping and localization units 262 can also receive sensor data from sensor units 264 to localize robot 202 in a map. In some implementations, mapping and localization units 262 can include localization systems and methods that allow robot 202 to localize itself in the coordinates of a map. As will be described further in this disclosure, mapping and localization units 262 can also process measurements taken by robot 202, such as by generating a graph and/or map.

In some implementations, communication units 266 can include one or more receivers, transmitters, and/or transceivers. Communication units 266 can be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

As used herein, network interfaces can include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi can include one or more of IEEE-Std. 802.11, variants of IEEE-Std. 802.11, standards related to IEEE-Std, 802.11 (e.g., 802.11 a/b/g/n/ac/ad/af/ah/ai/aj/aq/ax/ay), and/or other wireless standards.

Communication units 266 can also be configured to send/receive a transmission protocol over wired connections, such as any cable that has a signal line and ground. For example, such cables can include Ethernet cables, coaxial cables, Universal Serial Bus ("USB"), FireWire, and/or any connection known in the art. Such protocols can be used by communication units 266 to communicate to external systems, such as computers, smart phones, tablets, data capture systems, mobile telecommunications networks, clouds, servers, or the like. Communication units 266 can be configured to send and receive signals comprising of numbers, letters, alphanumeric characters, and/or symbols. In some cases, signals can be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communication units 266 can be configured to send and receive statuses, commands, and other data/information. For example, communication units 266 can communicate with a user controller to allow the user to control robot 202. Communication units 266 can communicate with a server/network in order to allow robot 202 to send data, statuses, commands, and other communications to the server. The server can also be communicatively coupled to computer(s) and/or device(s) that can be used to monitor and/or control robot 202 remotely. Communication units 266 can also receive updates (e.g., firmware or data updates), data, statuses, commands, and other communications from a server for robot 202 and/or its operative units 250.

In some implementations, one or more of operative units 250 may be instantiated remotely from robot 202. For example, mapping and localization units 262, may be located in a cloud and/or connected to robot 202 through communication units 266. Connections can be direct and/or through a server anchor network. Accordingly, implementations of the functionality of this disclosure should also be understood to include remote interactions where data can be transferred using communication units 266, and one or more portions of processes can be completed remotely.

In some implementations, actuator units 268 can include actuators such as electric motors, gas motors, driven magnet systems, solenoid/ratchet systems, piezoelectric systems (e.g., inchworm motors), magnetostrictive elements, gesticulation, and/or any way of driving an actuator known in the art. By way of illustration, such actuators can actuate wheels or other displacement enabling drivers (e.g., mechanical legs, jet engines, propellers, hydraulics, etc.). For example, actuator units 268 can allow robot 202 to move and/or navigate through environment 200 and/or any other environment. In some cases, actuator units 268 can include actuators configured for actions and/or action-specific tasks, such as mobilizing brushes for floor cleaning, moving (e.g., moving up, down, left, right, forward, back) squeegees, turning on/off water, spraying water, turning on/off vacuums, moving vacuum hose positions, gesticulating an arm, raising/lowering a lift, turning a camera and/or any sensor of sensor units 264, and/or any movement desired for robot 202 to perform an action.

In some implementations, user interface units 272 can be configured to enable a user (e.g., user 604 or any other user) to interact with robot 202. For example, user interface units 272 can include touch panels, buttons, keypads/keyboards, ports (e.g., USB, Digital Visual Interface ("DVT"), Display Port, E-Sata, Firewire. PS/2, Serial, video graphics array ("VGA"), Small Computer System Interface ("SCSI"), audioport, High-Definition Multimedia Interface ("HDMI"), Personal Computer Memory Card International Association ("PCMCIA") ports, memory card ports (e.g., SD and miniSD), and/or ports for computer-readable media), mice, rollerballs, consoles, vibrators, audio transducers, and/or any interface for a user to input and/or receive data and/or commands, whether coupled wirelessly or through wires (including, without limitation, any of the wireless or wired connections described in this disclosure, such as with reference to communication units 266). User interface units 272 can include a display, such as, without limitation. Liquid Crystal Display ("LCDs"), Light-emitting Diode ("LED") displays, LED LCD displays, In-Plane Switching ("IPSs"), cathode ray tubes, plasma displays. High Definition ("HD") panels, 4K displays, retina displays, organic LED displays, touchscreens, surfaces, canvases, and/or any displays, televisions, monitors, panels, screens, and/or devices known in the art for visual presentation. In some implementations, user interface units 272 can be positioned on the body of robot 202. In some implementations, user interface units 272 can be positioned away from the body of robot 202, but can be communicatively coupled to robot 202 (e.g., via communication units 266) directly or indirectly (e.g., through a network or a cloud).

In some implementations, navigation units 276 can include components and/or software configured to provide directional instructions for robot 202 to navigate. Navigation units 276 can process maps and localization information generated by mapping and localization units 262, sensor data from sensor units 264, and/or other operative units 250. For example, navigation units 276 can receive map 300 from mapping and localization units 262. Navigation units 276 can also receive localization information from mapping and localization units 262, which can be indicative at least in part of the location of robot 202 within map 300, including route 306. Navigation units 276 can also receive sensor data from sensor units 264 which can be indicative at least in part of objects around robot 202. Using one or more of the map, location, and sensor data, navigation units 276 can instruct robot 202 where to navigate (e.g., go forward, left, tight, back, and/or any other direction).

Navigation units 276 can also implement actions and/or action-specific tasks, such as mobilizing brushes for floor cleaning, moving (e.g., moving up, down, left, right, forward, back) squeegees, turning on/off water, spraying water, turning on/off vacuums, moving vacuum hose positions, gesticulating an arm, raising/lowering a lift, turning a camera and/or any sensor of sensor units 264, and/or any action taken by robot 202. In some cases, such actions and/or action-specific tasks can be indicated in a map and be executed by actuator units 268.

In some implementations, power supply 256 can include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries can be rechargeable, such as wirelessly (e.g., by a resonant circuit and/or a resonant tank circuit) and/or by plugging into an external power source. Power supply 256 can also be any supplier of energy, including wall sockets and electronic devices that convert solar, wind, water, nuclear, hydrogen, gasoline, natural gas, fossil fuels, mechanical energy, steam, and/or any power source into electricity.

In some implementations, operating system 270 can be configured to manage memory 252, controller 254, power supply 256, modules in operative units 250, and/or any software, hardware and/or features of robot 202. For example, and without limitation, operating system 270 can include device drivers to manage hardware resources for robot 202.

As previously mentioned, any of the aforementioned components of robot 202 can be instantiated in software and/or hardware. For example, a unit/module can be a piece of hardware and/or a piece of code run on a computer.

Figure 4A:
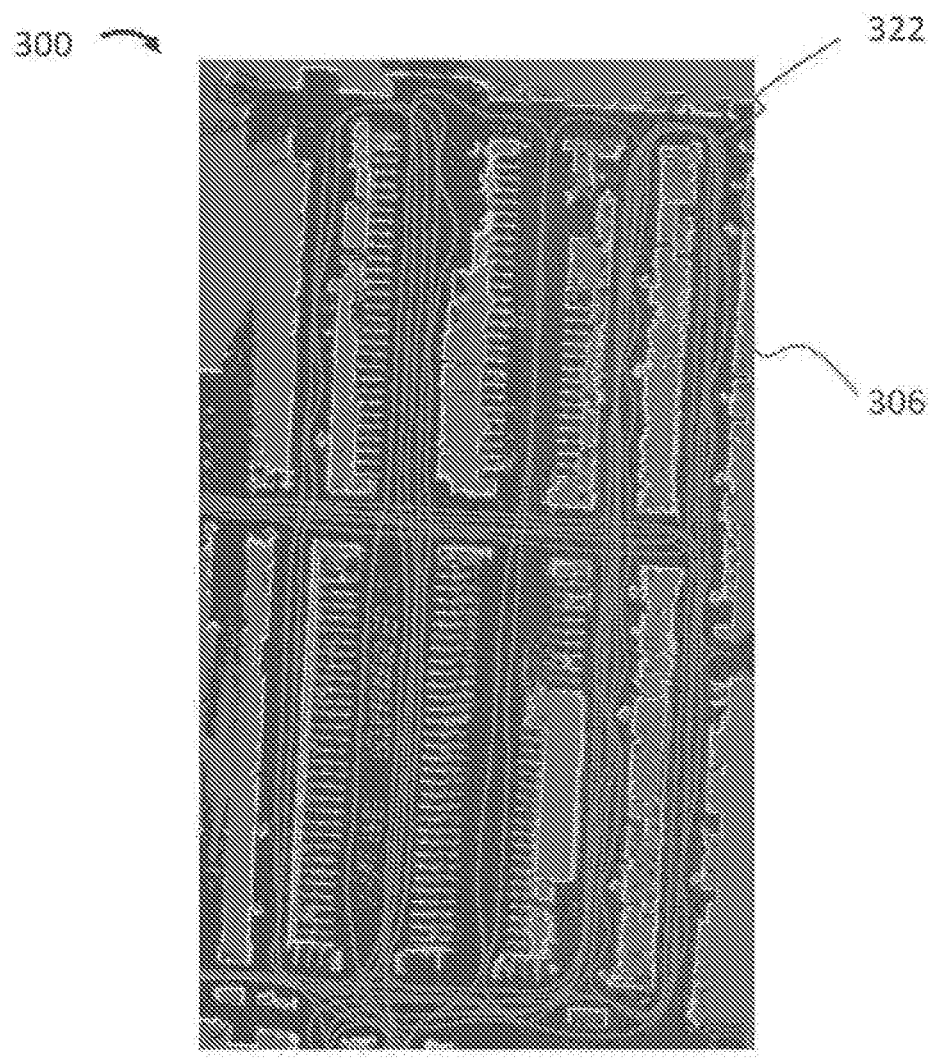
FIG. 4A is a top view map and route generated by a robot as it travels in an environment in accordance with some implementations of this disclosure.
Figure 4B:
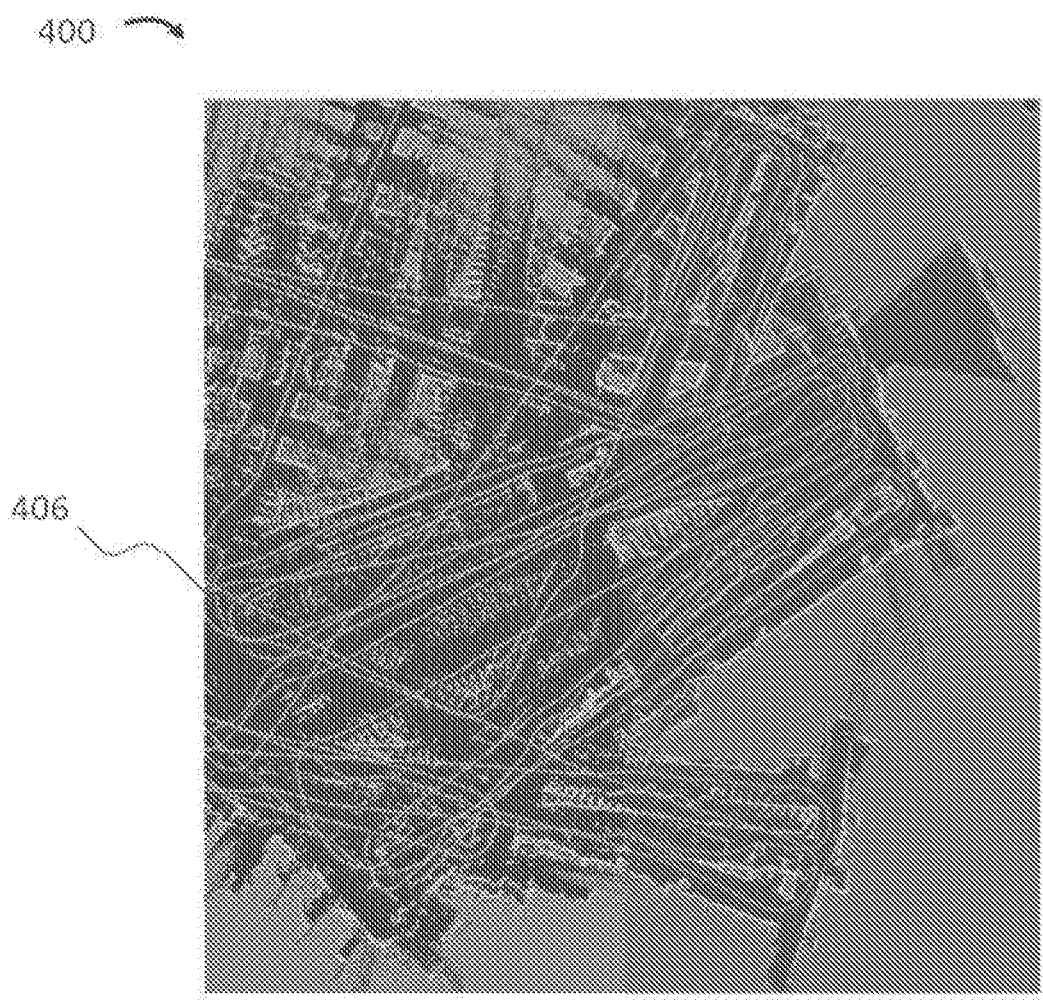
FIG. 4B is a map that does not accurately reflect the surrounding and traveled route of a robot in accordance with some implementations of this disclosure.

FIG. 4A is a top view map 300 and route 306 generated by robot 202 as it travels in environment 200 in accordance with some implementations of this disclosure. In some implementations, the generation of map 300 can be performed by mapping and localization units 262. Map 300 can comprise pixels, wherein each pixel corresponds to a mapped area of environment 200. The number of pixels in map 300 can be determined based on the resolution of map 300. Map 300 can be substantially similar in layout as environment 200, where each pixel in map 300 can approximate a location in environment 200. Robot 202 can appear on map 300 as robot indicator 302. Each pixel can represent an area, which can be uniform or non-uniform. For example, a pixel could represent one area unit, a n×m or n×n area unit, or a non-uniform unit of area.

The mapping can be performed by imposing data obtained at least in part by sensor units 264 into a two-dimensional ("2D"), three-dimensional ("3D"), and/or four-dimensional ("4D") map representative at least in part of environment 200. For example, map 300 can include depictions representative at least in part of obstacles and/or objects detected by robot 202. Map 300 can also record demonstrated routes, such as routes robot 202 learned while under user control. For example, mapped route 322 can include coordinates (e.g., x and y in a 2D map and x, y, and z in a 3D map) based at least in part on the relative position, orientation, and/or pose of robot 202 (e.g., including one or more of location, displacement, and orientation) to a reference, such as initialization location 222. For example, pose can have (x, y, theta) coordinates. As used herein, the term position has its ordinary and customary meaning. For example, in some cases, position can include a location in terms of displacement, coordinates, etc. of an object, robot 202, etc. In some cases, position can also include an orientation of an object, robot 202, etc. Accordingly, in some cases, the terms position and pose may be used interchangeably to include one or more of location, displacement, and orientation. Map 300, created through the demonstration process, can record part of and/or substantially the whole of the environment that robot 202 sensed in one or more demonstrations/trainings. For this reason, some may call map 300 a global map. In some cases, map 300 can be static in that after a demonstration/training, map 300 may not be substantially updated. In some implementations, map 300 and mapped route 306 can also be generated separately (e.g., by a user using a computer) and uploaded onto robot 202.

In some implementations, pixels (and/or voxels in 3D) of map 300 can have one or more states, where the pixel state is indicative at least in part of a characteristic of the position/location in environment 200 represented by that pixel. For example, pixels of map 300 can be binary, where a first pixel state (e.g., pixel value) is indicative at least in part of a clear (e.g., navigable) location, and a second pixel state is indicative at least in part of a blocked (e.g., not navigable) location. By way of illustration, a pixel value of zero (0) can be indicative at least in part of a clear location and a pixel value of one (1) can be indicative at least in part of a blocked location.

In some implementations, instead of or in addition to the aforementioned binary states, pixels of map 300 can have other pixels states such as one or more of: a pixel state indicative at least in part of an unknown location (e.g., a position/location with no information), a pixel state indicative at least in part of a position/location that should not be traveled to; a pixel state indicative at least in part of being part of a navigable route; a pixel state indicative at least in part of an area in which robot 202 has traveled, a pixel state indicative at least in part of an area to which robot 202 has not traveled, a pixel state indicative at least in part of an object, a pixel state indicative at least in part of standing water, and/or any other categorization of a position/location on map 300. In some implementations, a pixel state, and/or data associated with a pixel, can be indicative at least in part of actions and/or action-specific tasks, such as mobilizing brushes for floor cleaning, moving (e.g., moving up, down, left, right, forward, back) squeegees, turning on/off water, spraying water, turning on/off vacuums, moving vacuum hose positions, gesticulating an arm, raising/lowering a lift, turning a camera and/or any sensor of sensor units 264, and/or any other action by robot 202.

Pixels of map 300 can also store more than a single value or pixel state. For example, each pixel of map 300 can store a plurality of values such as values stored in a vector and/or matrix. These values can include values indicative at least in part of the position/pose (e.g., including location and/or orientation) of robot 202 when the position is measured at a point (e.g., pixel) along route 306. These values can also include whether robot 202 should clean or not clean a position/location, and/or other actions/action-specific tasks that should be taken by robot 202.

Robot 202 can travel along a route (e.g., 206 pictured in FIG. 2), which can be reflected in map 300 as route 306. At each location robot 202 travels along the route, robot 202 can determine its position and/or orientation, in some cases relative to an initialization location (e.g., initialization location 222), home locator (e.g., home locator 220), and/or another reference point. These mapping and localization functions can be performed by mapping and localization units 262. The initialization location can be represented on map 300 as mapped position 322. In some cases, mapped position 322 can be determined relative to a home locator (which in some implementations can also be a pinpoint on map 300 and/or otherwise represented therein).

For example, robot 202 can measure or approximate its distance from initialization location 204 (or another reference point) using odometry, where it uses proprioceptive sensors of sensor units 264 (e.g., wheel encoders (e.g., rotary encoders), visual odometry, Inertial Measurement Units ("IMUs") (including accelerometers, magnetometers, angular rate sensors), and the like), to track the movements of robot 202 since starting at initialization location 202. By way of illustrative example, one or more of the proprioceptive sensors can be wheel encoders that measure and/or estimate distance based on the revolution of the wheels of robot 202. As another illustrative example, visual odometers can be used to measure or estimate the distance travelled and/or orientation of robot 202 through sequential images taken by a camera. The visual odometers can construct an optical flow field (e.g., using Lucas-Kanade methods or other methods) and/or estimate camera motion, such as by using Kalman filters or projection. As another non-limiting example, IMUs can be used to measure and/or estimate the position and/or orientation of robot 202.

Figure 6A:
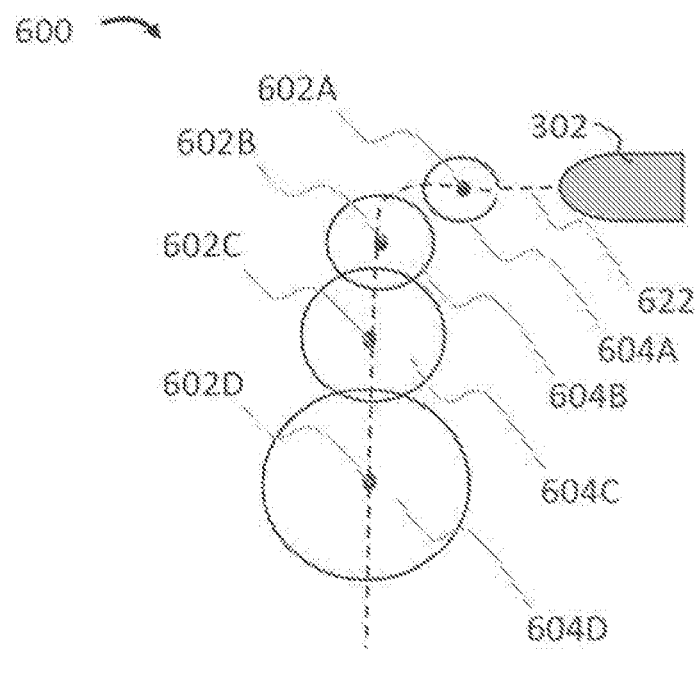
FIG. 6A is a top view of a diagram comprising discretized measurements of a robot along a route in a graph in accordance to some implementations of the present disclosure.

Robot 202 can record route 306 in map 300, as robot indicator 302 (e.g., as seen in FIG. 6A and elsewhere) progresses along map 300 in a substantially similar way as robot 202 navigates through environment 200. Advantageously, in some implementations map 300 and route 306 can be created together, wherein robot 202 maps the environment 200 and records route 306 at substantially similar times. Accordingly, in some implementations, map 300 and route 306 can be paired together wherein each recorded route is stored only with a particular map.

Each location that is part of route 206 can correspond to a pixel on route 306 in map 300, where the pixel state of route 306 indicates the pixel is part of a navigable route. As robot 202 travels, robot 202 can also measure robot's 202 position and/or orientation relative to objects using one or more sensors units 264. These measures can be taken at discrete times and/or locations, represented as nodes. Robot 202 can also take scans using one or more of sensor units 264 to detect its environment. In this way, robot 202 can detect anti/or measure the position and/or orientation of robot 202 relative to objects, such as shelves or walls.

In the case where robot 202 detects objects, robot 202 can use sensors units 264 to detect and/or measure the position and/or orientation of those objects in a plurality of directions relative to robot 202. At the same time, robot 202 can use sensors units 264 to estimate robot's 202 position and/or orientation. As robot 202 moves in the environment, different objects can come within the range of sensors of sensor units 264. For example, sensors can be positioned on front side of robot 202 and can have a predetermined range. For example, robot 202 can detect objects at a front side up to the predetermined range. Similarly, other sensors can each have ranges and detect objects within those ranges. These sensors can be positioned on the front, back, left side, right, side, bottom, top, and/or any combination of the foregoing.

In some cases, sensors units 264 may not sense certain areas. For example, an object can impede the availability of robot 202 to sense an area, or the area may appear in a blind spot (e.g., place not covered by the measuring range of the sensors).

The environment mapped in map 300 is a larger set than that illustrated in FIG. 2 as environment 200. Route 306 includes traversals of the aisles and other movements, including horizontally illustrated traversals through paths between aisles. As illustrated in map 300, robot 202 can clean a floor while traversing the aisles, driving over each aisle a plurality of times.

In some cases, FIG. 4A can be a completed top view map 300 in accordance with some implementations of this disclosure. Robot 202 can begin and end at mapped position 322. The completed map 300 of FIG. 4A illustrates a completed, accurate map. However, it is not straight-forward to create a map substantially similar to the ground truth simply by plotting data collected by sensor units 264 on a map. Sensors of sensor units 264 have noise, measurement drift, etc. As a result, sensors of sensor units 264 may not always unambiguously identify features in the environment Sensors of sensor units 264 may also not always unambiguously identify the position and/or pose of robot 202.

Because identification by sensor units 264 may not be unambiguous, robot 202 cart probabilistically determine its position and/or the position of features of the environment 200. As robot 202 moves through environment 200 while mapping, it can record sensor data from sensor units 264 as well as internal robot commands (e.g., move forward, left, right, back, rotate, etc.). The sensor data from sensor units 264 can also be compared to itself or other data, such as through scan matching to determine the relative positions. As a result, robot 202 (e.g., using mapping and localization units 262) can build a posterior probability distribution function of a map given at least sensor data, scan matching, and the internal robot commands. Other factors may also be considered.

Because of the ambiguity in measurements, robot 202 can generate maps that do not reflect its surrounding and traveled routes if not corrected. FIG. 4B is a map 400 that does not accurately reflect the surrounding and traveled route of robot 202 in accordance with some implementations of this disclosure. Because of noise, sensor drift, and other factors, map 400 appears distorted. As a result, route 406 appears to go all over the place. The mapped environment around route 406 appears to spread out and overlap upon itself, with features that do not reflect the ground truth. By comparison, map 400 can be corrected into map 300, where map 400 is actually a map of the same environment and route as map 300; however, map 400 is distorted and map 300 more accurately reflects reality. As can be observed, environment actually comprises a series of aisles (e.g., appearing as columns).

Figure 5:
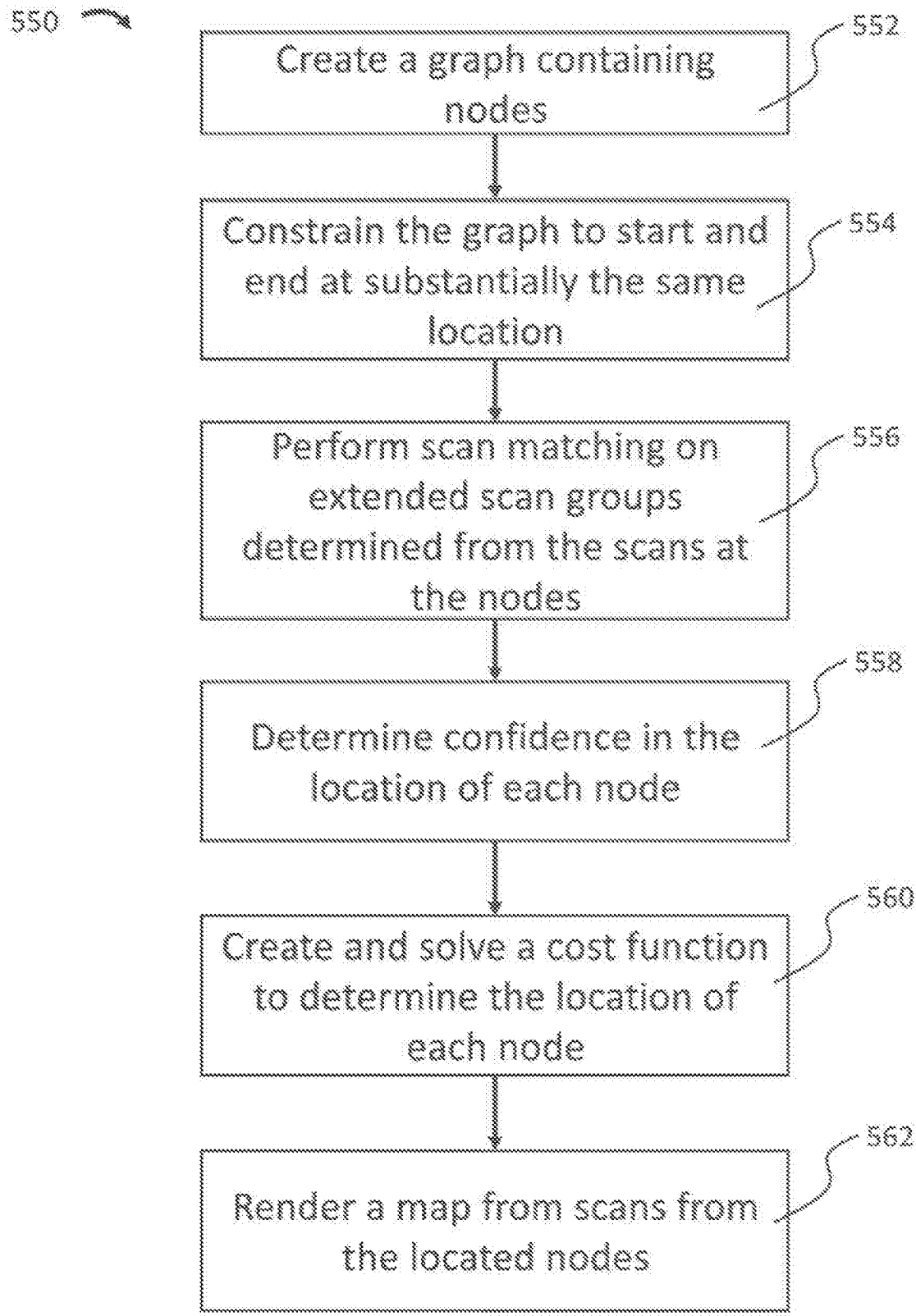
FIG. 5 is a process flow diagram of an exemplary method for creating a map in accordance with some implementations of the present disclosure.

FIG. 5 is a process flow diagram of an exemplary method 550 for creating a map in accordance with some implementations of the present disclosure. For example, block 552 includes creating a graph containing nodes. Block 554 includes constraining the graph to start and end at substantially the same location. Block 556 includes performing scan matching on extended scan groups determined from the scans at the nodes. Block 558 includes determining confidence in the location of each node. Block 560 includes creating and solving a cost function to determine the location of each node. Block 562 includes rendering a map front the scans from the located nodes. This process flow diagram is provided for illustrative purposes only. In some cases, one or more blocks can be omitted in the process. Moreover, as described in this disclosure, various other blocks may be added and/or or used in the alternative.

The creating a graph containing nodes of block 522 of FIG. 5 can be performed, in some cases, by mapping and localization unit 262 and/or controller 254 as robot 202 travels in an environment. By way of further illustration. FIG. 6A is a top view of a diagram comprising discretized measurements of robot 202 (illustrated in FIG. 2) along route 622 in graph 600 in accordance to some implementations of the present disclosure. Route 622 is used for illustrative purposes. In some cases, route 622 can be representative of a route and/or trajectory connecting nodes determined by robot 202, which is illustrated in the graph space of graph 600 as robot indicator 302, from the discrete nodes 602A-602D. Accordingly, as illustrated in figures herein, routes are drawn for ease of reference, however, systems and methods described herein may be applied prior to and/or after routes are determined.

As robot 202 navigates along the route represented by route 622 illustrated in graph 600, it can take measurements at nodes 602A-602D (again illustrated in the map space of graph 600), such as by using sensor units 264. A per son having ordinary skill the art would appreciate that there can be a plurality of nodes, the number of which can be determined based at least in part on the resolution of sensors of sensor units 264, the speed of robot 202 (e.g., represented by robot indicator 302), the noise and/or error of the sensors of sensor units 264, predetermined tuning of robot 202 (e.g., setting node distance or time between establishing nodes), etc. FIG. 6A only illustrates one example configuration of example route 622. For example, the distance between nodes can be set as a predefined parameter in standard units (e.g., millimeters, centimeters, meters, inches, feet, etc.) or relative units (clicks, pixels, lengths, etc.). The distance can be determined based on the resolution desired, which can be dependent on considerations of desired accuracy, storage size, noise, etc. For example, fewer nodes can take up less storage space, but provide less information than more nodes. The gathering of information from nodes 602A-6020, and the one or more systems and methods used for mapping, can be performed by mapping and localization units 262 and/or controller 254.

Each of nodes 602A-602D can represent positions of measurements (e.g., scans) by robot 202. Each of nodes 602A-602D can be associated with a pose (e.g., including measurements such as (x, y, θ) of robot 202). The pose of robot 202 can be relative to a location and/or orientation (e.g., initialization location 222 and/or home locator 220) and/or features of environment 200. The pose can be determined from data obtained by laser scans, LIDAR, odometry, and/or any other sensor of sensor units 264. Moreover, in some cases, nodes can be positioned on substantially similar spots, such as, for example, when robot 202 passes by the same location a plurality of times.

Each of edges between nodes 602A-602D can have an associated probabilistic function and/or probabilistic distribution, illustrated for each of nodes 602A-602D as ranges 604A-604D, respectively. In some cases, ranges 604A-604D can be computed using a posterior probability distribution. In some cases, ranges 604A-604D can be derived from the mean computed position plus the covariance. In some cases, the probability distribution can be computed using a Bayesian framework, where the uncertainties of the nodes can be stored in one or more data structures, such as matrices (e.g., covariance matrices). A person having ordinary skill in the art would appreciate that ranges 604A-604D can also be computed using other statistical methods, such as the cross-variance, variance, chi-square distribution, and/or any other statistical methods used in, for example. Simultaneous Localization and Mapping ("SLAM") and/or other techniques for determining pose known in the art. In some cases, ranges 604A-604D can be representative, at least in part, of areas around each node 602A-602D, wherein the actual location of robot 202 relative to graph 600 (e.g., illustrated as robot indicator 302) can be within the areas. For example, instead of node 602B being located as illustrated, node 602B can actually be located anywhere within range 604B, and with different poses, including positions and/or orientations, within range 604B. In some cases, each position within any one of ranges 604A-604D can have associated probabilities, wherein some positions are more likely than other. In some cases, due to compounding noise, sensor drift, and other factors, subsequent ones of ranges 604A-604D can become larger as seen from the position of robot indicator 302 as illustrated, representing more uncertainty of the positioning of nodes 602A-602D. However, some factors, such as the identification of distinct features, scan matching, calibration, external identification, etc., can actually reduce the size of one or more ranges 604A-604D as compared to preceding ones of ranges 604A-604D.

Figure 6B:
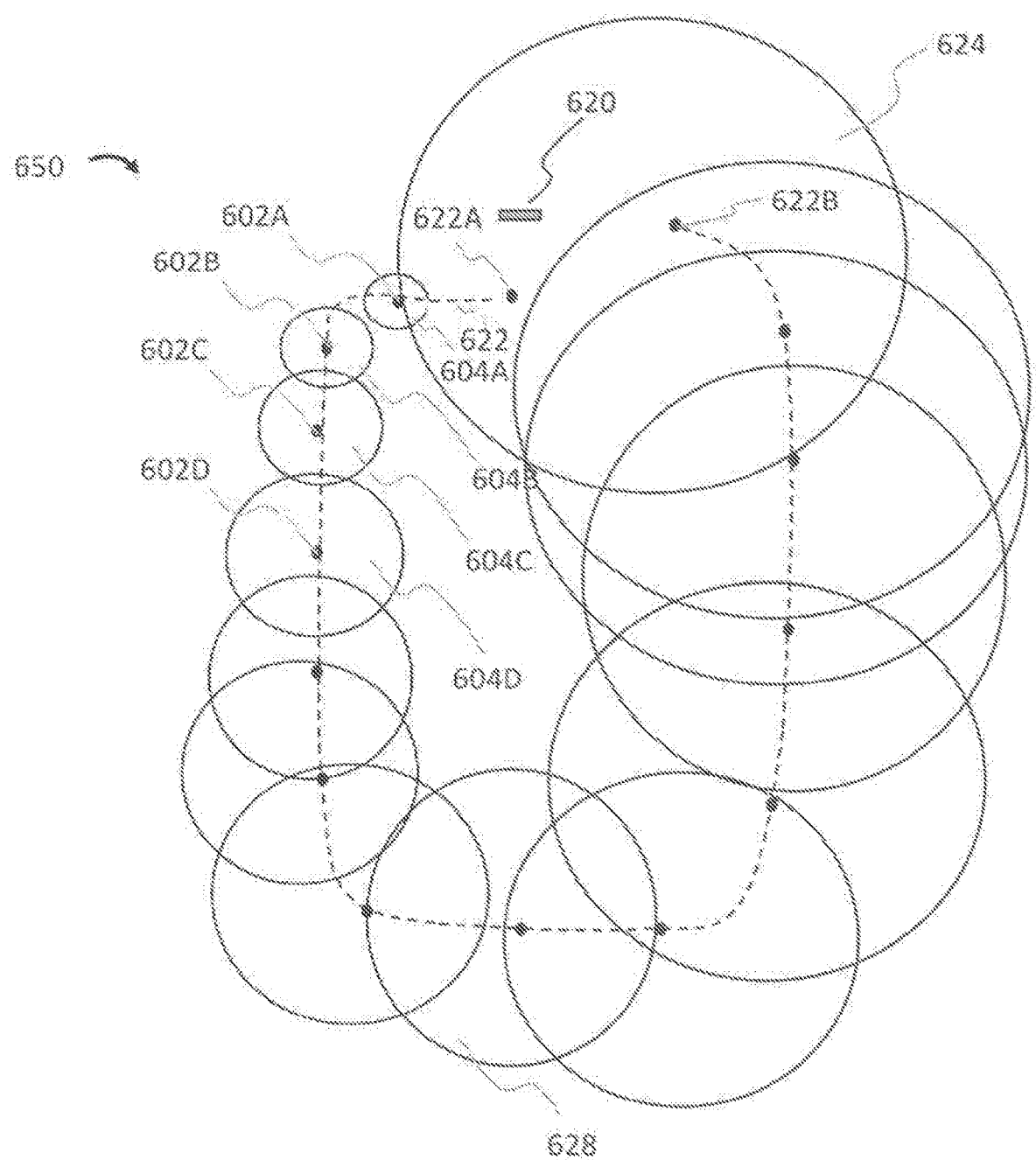
FIG. 6B is a top view of a diagram of a graph, which includes a continuation of the route illustrated in FIG. 6A in accordance with some implementations of this disclosure.

FIG. 6B is a top view of a diagram of graph 650, which includes a continuation of route 622 of FIG. 6A in accordance with some implementations of this disclosure. As illustrated, robot 202 can begin, as represented on graph 650, at node 602A. Node 602A can be positioned relative to indicator 620, which can be the mapped/graphed position of a home locator. As described with reference to FIG. 6, robot 202 can map nodes 602A-602D. However, one challenge that can occur is that errors can accumulate as robot continues on route 622. For example, ranges can continue to expand throughout as viewed from the location of node 622A (whose position may be determined relative to a home locator, such as indicator 620). By way of illustration, range 628 can be larger than range 604D, and range 624, associated with node 622B, can be even larger. Accordingly, with the larger ranges, there can be more ambiguity in the locations of those nodes. As a result, optimizing graph 650 using conventional SLAM and/or any other algorithm can be computationally expensive and/or inaccurate. The computation, time, and processing costs can be high in trying to find the optimization.

Figure 6C:
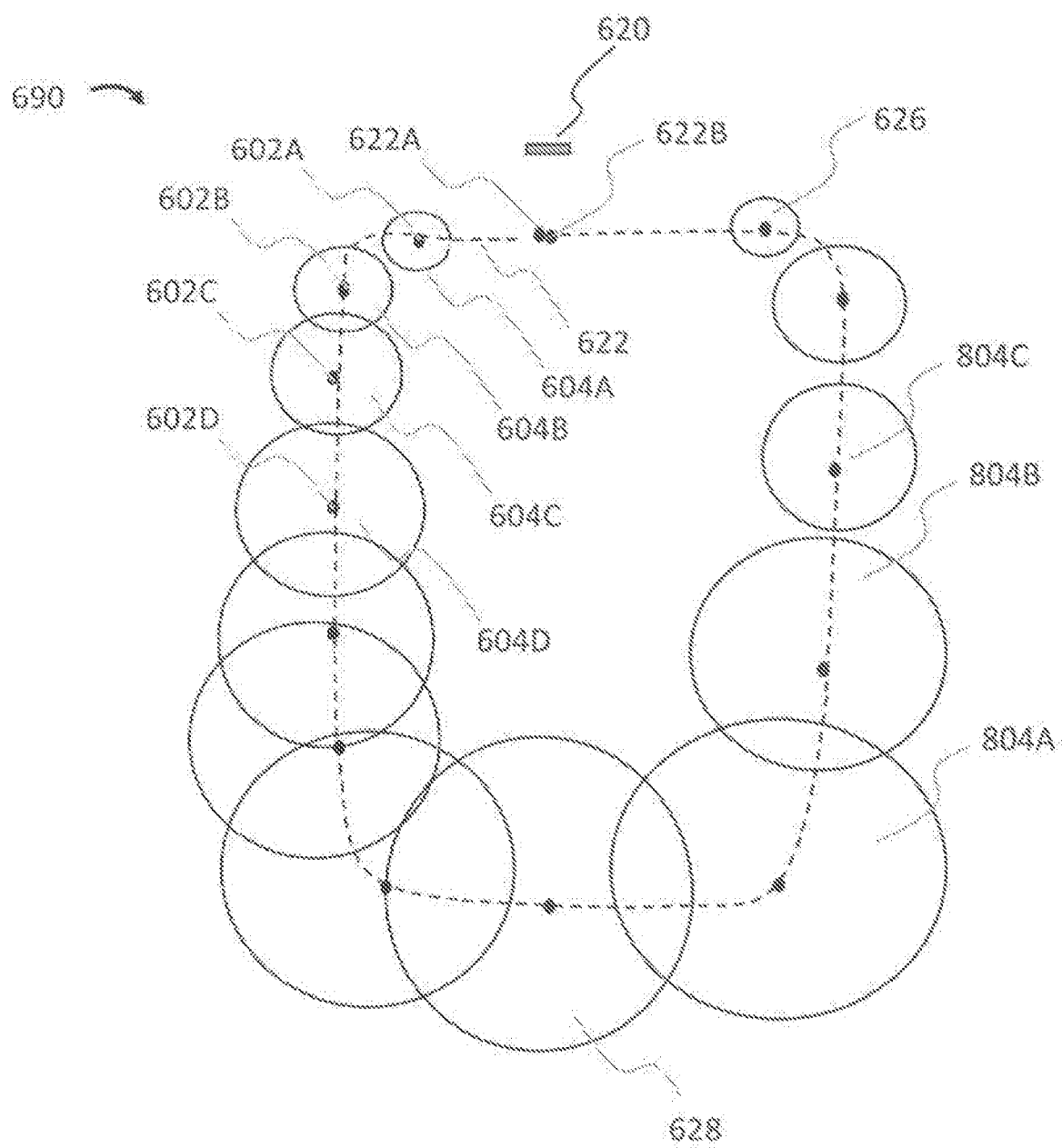
FIG. 6C illustrates a constraint for the graph from FIG. 6B in accordance with some implementations of the present disclosure, wherein the starting and ending locations are at the same and/or substantially the same location.

In some implementation, the constraining of the graph to start and end at substantially the same location of block 554 of FIG. 5 can be performed by mapping and localization unit 262 and/or controller 254. FIG. 6C illustrates a constraint for graph 690 from FIG. 6B in accordance with some implementations of the present disclosure, wherein the starting and ending locations are at the same and/or substantially the same location. Graph 690 illustrates the nodes from graph 650, where nodes 622A and 622B are now constrained to be in substantially the same location. In some implementations nodes 622A and 622B can be in the same and/or substantially the same location in order to constrain graph 690, and the nodes therein, to graphs that start and end at the same and/or substantially similar location. In some cases, graphs that end at the same and/or substantially the same can be determined by detection of a home locator as illustrated by indicator 620. In these cases, where robot 202 detects the same home locator (e.g., represented by indicator 620 on graph 690) at the beginning and/or end of route 622, such detection can be indicative at least in part that nodes 622A and 622B are in the same and/or substantially the same location.

In some implementations, substantially similar can be predetermined, such as based on one or more thresholds relating to x-distances, y-distances, z-distances, angles, etc. For example, there can be distance and/or angle thresholds, such as those based on standard units (e.g., inches, meters, degrees, and/or other standard units) or relative units (e.g., clicks, pixels, lengths, etc.). The threshold can be determined based at least in part on the resolution of sensors of sensor units 264, noise from sensors of sensor units 264, sensor drift from sensors of sensor units 264, acceptable errors in graphing/mapping, empirical evidence of performance, view of a reference feature (e.g., home locator and/or other objects) and/or other factors.

Advantageously, this constraint can reduce ambiguity. Working from the known (and/or assumed) positions of nodes 622A and 622B, which are the start and end positions respectively, error propagation can then be taken in both directions. Accordingly, by way of illustration, range 626 is markedly reduced from the analogous node form FIG. 6B, and the largest range is elsewhere, such as range 628. Noticeably, this reduction of ambiguity of node locations can further reduce computation, time, and processing costs in optimizing graph 690 as compared to graph 650. Ranges 804A, 804B, and 804C will be discussed in further detail with reference to FIG. 8.

In some cases, confidence in a location can be determined through other methods, such as scan matching. By way of illustration, robot 202 can use scan matching, which can include registering a plurality of scans (e.g., laser scans) from sets of nodes to determine their relative positions. In some cases, scan matching can be used to determine the rigid-body transformation (e.g., using translations and/or rotations) that aligns best a scan and a graph/map, a scan and a scan, and/or a graph/map and a graph/map.

By way of illustration, a robot sensing an environment from two nodes, $x_0$ and $x_0$, can obtain LIDAR scans $z_0$ and $z_1$. These LIDAR scans can capture a scan of the environment. For example, provided some parts of the environment are visible from both $x_0$ and $x_1$, scan matching can be used to find a rigid transform that will project the points $z_1$ so that they align with $z_0$. Scan matching, in some forms, has been used in mapping algorithms such as SLAM and others.

Figure 7A:
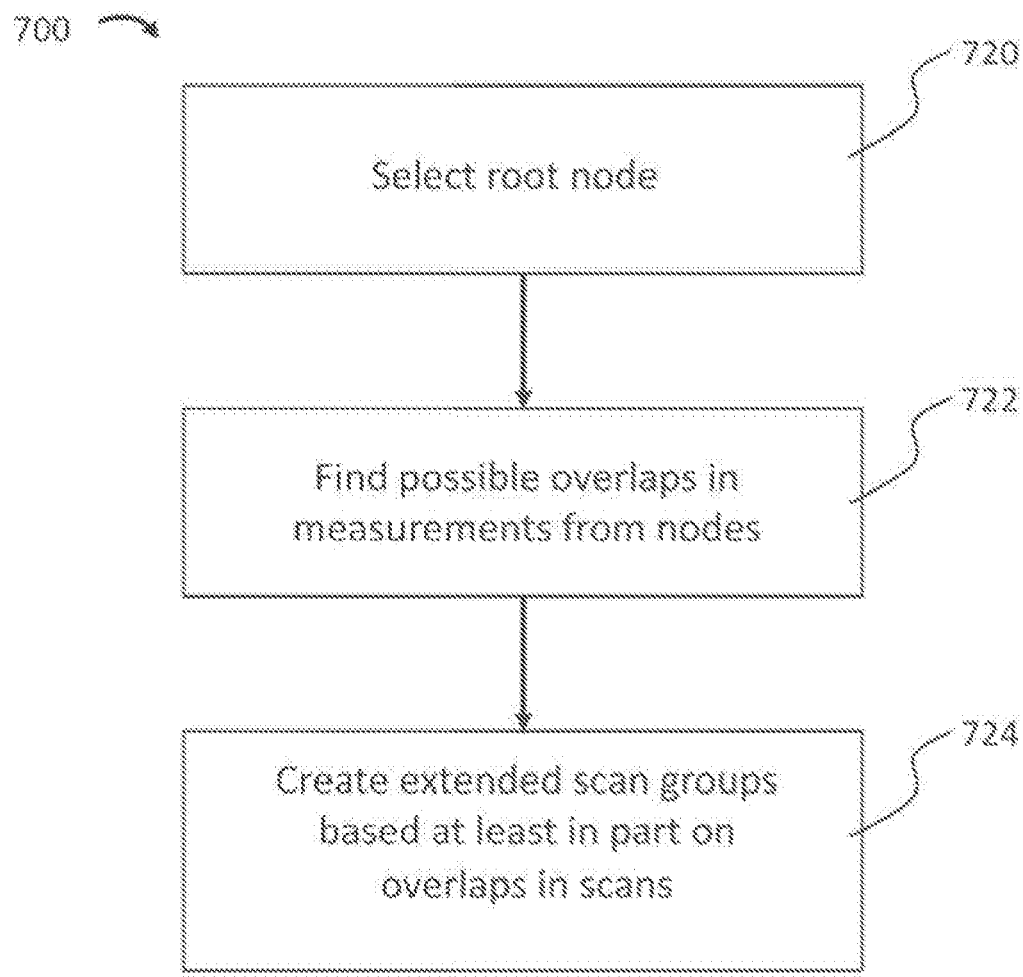
FIG. 7A is a process flow diagram of an exemplary method for creating an extended scan group in accordance with some implementations of this disclosure.

In some cases, the performing of scan matching on extended scan groups determined from the scans at the nodes of block 556 can be performed by mapping and localization unit 262 and/or controller 254 FIG. 7A is a process flow diagram of an exemplary method 700 for creating an extended scan group in accordance with some implementations of this disclosure. Block 720 includes selecting a root node. The root node can include a node from which other nodes are viewed (e.g., the position, distances, poses, angles, etc. and/or certainty relative to the root node). Block 722 includes finding possible overlaps in measurements from nodes. Overlaps of measurements from nodes can include overlaps where scans have features in common and/or are in close proximity. For example, overlap can include scans from nodes that have captured the same feature. By way of illustration, as robot 202 navigates, it can use sensor units 264 to take measurements in its environment. In some cases, such measurements can be done using a scan LIDAR. Accordingly, the scan LIDAR can take measurements of an object within its range as robot 202 navigates. Based on the proximity of the nodes where robot 202 takes scans, individual scans can capture the same object, but at different points in time and/or space (e.g., a first scan can include an object as robot 202 approaches it, a second scan can include the object as robot 202 is near it, a third scan can include the object as robot 202 passes it, a fourth scan can include the object as robot 202 moves further away, etc.). In this way, these overlapping measurements can capture different aspects of a same feature in an environment. Moreover, these measurements can also be substantially proximate in time and/or space. For example, proximity can include nodes that are sequentially next to each other, or within a predetermined number of nodes. Proximity can also include times that are within a predetermined threshold time, such as threshold times determined based at least in pan on sensor resolution, capture times, the speed of robot 202, etc.

Block 724 includes creating groups of nodes based at least in part on overlaps to form extended scan groups. Each extended scan group can include a predetermined number of nodes, such as 2, 3, 4, 5, or more nodes. The number of nodes can be chosen based at least in part on the desired accuracy of scan matching, the data size of each scan, computational resources, etc. In many cases, three nodes can be used to balance the amount of information provided by having more scans and the complexity of performing the scan matching.

In some cases, not every node may be in a group. Finding groups can further include only grouping nodes that include and/or are proximal to distinct features. Distinct features can include features that can be distinctive and/or identifiable. For example, hallways with nearly identical walls throughout may not include distinct features. By way of illustration, distinct features can include objects, obstacles, fixtures, and/or any aspect that can make a location distinguishable from at least some other locations. Advantageously, where only groups with distinct features are used, robot 202 can further reduce consumption of system resources by focusing on scan matches that will provide useful and/or less ambiguous information. Advantageously, reliance on the distinct features can reduce false positives.

In some cases, the same nodes may be used in multiple extended scan groups. In some cases, different extended scan groups can include the same nodes. However, in some cases, each node can be restricted to only being in one extended scan group. Accordingly, determining whether a node belongs in a particular group depends on one or more factors, included in various implementations. The relative weights of each of these factors as implemented can be adjusted between implementations based at least in part on the environment, distinct features (and/or lack thereof), empirical performance measures, etc. A first factor can include the amount of a distinct feature captured in a scan from a node. For example, if more measurements of a distinct feature are captured in a scan from a node, that scan from that node would be more likely to be included in an extended scan group with similarly more measurements of a distinct feature instead of other scans from other nodes that had fewer measures of tire distinct feature. A second factor can include proximity to other nodes. Nodes that are in proximity to each other would be more likely to be included together in an extended scan group. Proximity can be based at least in part on distance and/or angle thresholds, determined based at least in part on sensor resolution, density of nodes (e.g., how many nodes are in a space, where proximity may be defined as closer in the situation where there are more nodes in a given space as compared to when there are fewer nodes in a given space), empirical results, etc. A third factor can include the presence of other distinct features within a scan. For example, a scan at a node can have measurements of a plurality of distinct features. In order to optimize matches, having more extended scan groups can be favorable. Accordingly, where more scans are desired to complete extended scan groups, having scans with multiple distinct features assigned to sets of scans that would otherwise be too few to create an extended scan group would be preferable. In such a situation, robot 202 can be calibrated so it is more likely that more extended scan groups are produced. On the other hand, in other cases, having larger extended scan groups could be advantageous for the speed of computation. A fourth factor can include the size of the extended scan groups. As aforementioned, each extended scan group can be a predetermined sized. Accordingly, determining whether a particular scan from a node belongs with other scans from nodes is dependent on the size of the extended scan groups.

In some cases, recursive and/or iterative grouping algorithms can be used to match scans into extended scan groups. In some cases, based on one or mote performance criteria, each set of extended scan groups can be evaluated. The performance criteria can be based on one or more of the above factors. In some cases, algorithms, such as the minimal cut, graph theory, and/or other grouping algorithms can be implemented to divide the nodes of a graph, and associated scans, into extended scan groups.

Figure 7B:
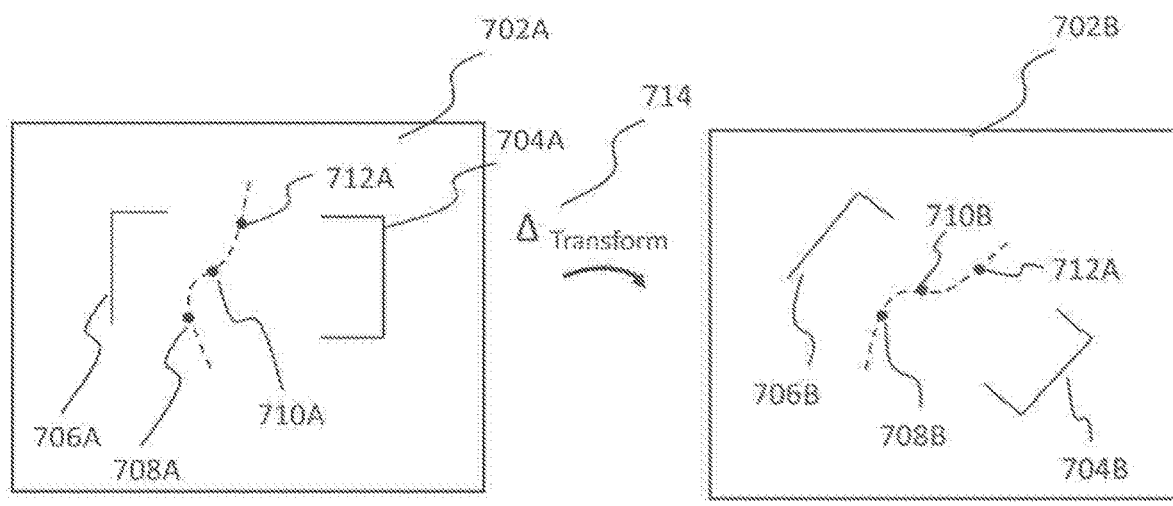
FIG. 7B is a conceptual diagram of a scan matching transformation in accordance with some implementations of the present disclosure.

Once groups have been identified, a scan matcher (e.g., as part of mapping and localization units 262) can be used to determine locations and or orientations of scans FIG. 7B is a conceptual diagram of a scan matching transformation in accordance with some implementations of the present disclosure. In some cases, a plurality of nodes can be used in a scan matcher, forming an extended scan group. The extended scan group can be compared to other extended scan groups to determine relative translations (and as a result, locations) and/or rotations. Advantageously, the extended scan groups can provide more context (e.g., information, data, etc.) and/or improve one or more of: the speed of graph/map optimization, the accuracy of graphs/maps relative to the ground truth, and the computational and other resource costs of optimization. If a larger scan group has been matched to a location, robot 202 can have relatively high confidence in the location of the nodes involved in the scan matching. In some cases, such as the matching of an extended scan group to previous scans, the confidence can at least match that of the previous scan. In some cases, there can be greater confidence if the extended scan groups and the previous scans were recorded by robot 202 having substantially similar locations and/or orientations. Moreover, in some cases, known information can be included, wherein the location of features in a graph are known a priori. Accordingly, such information can further increase confidence.

Scan matching can identify locations based at least in part on overlap of an extended scan group to another extended scan group. Overlap can be determined by algorithms known in the art, such as correlation, iterative comparisons, area of intersection, associations (e.g., point-to-point, point-to-feature, feature-to-feature, etc.), regression algorithms, closest point algorithms (e.g., Iterative Closest Point ("ICP")), nearest neighbor searching algorithms, and others.

By way of illustration, frame 702A illustrates nodes 708A, 710A, and 712A, as well as detected features 704A and 706A based on scans at nodes 708A, 710A, and 712A. Transform function 714 illustrates a rigid body transform, which can perform scan matching of frame 702A. Transform function 714 can perform translational and/or rotational movements of scans/nodes in frame 702A. As a result, frame 702B illustrates translated and rotated versions as nodes 708A, 710A, and 712A as nodes 708B, 710B, and 712, as well as translated and rotated versions of detected features 704A and 706A as detected features 704B and 706B. In some implementations, transform function 714 may not be a rigid body transform, wherein the relative positions of one or more of nodes 708A, 710A, and 712A and/or detected features 704A and 704B can change relative to one another.

Figure 8:
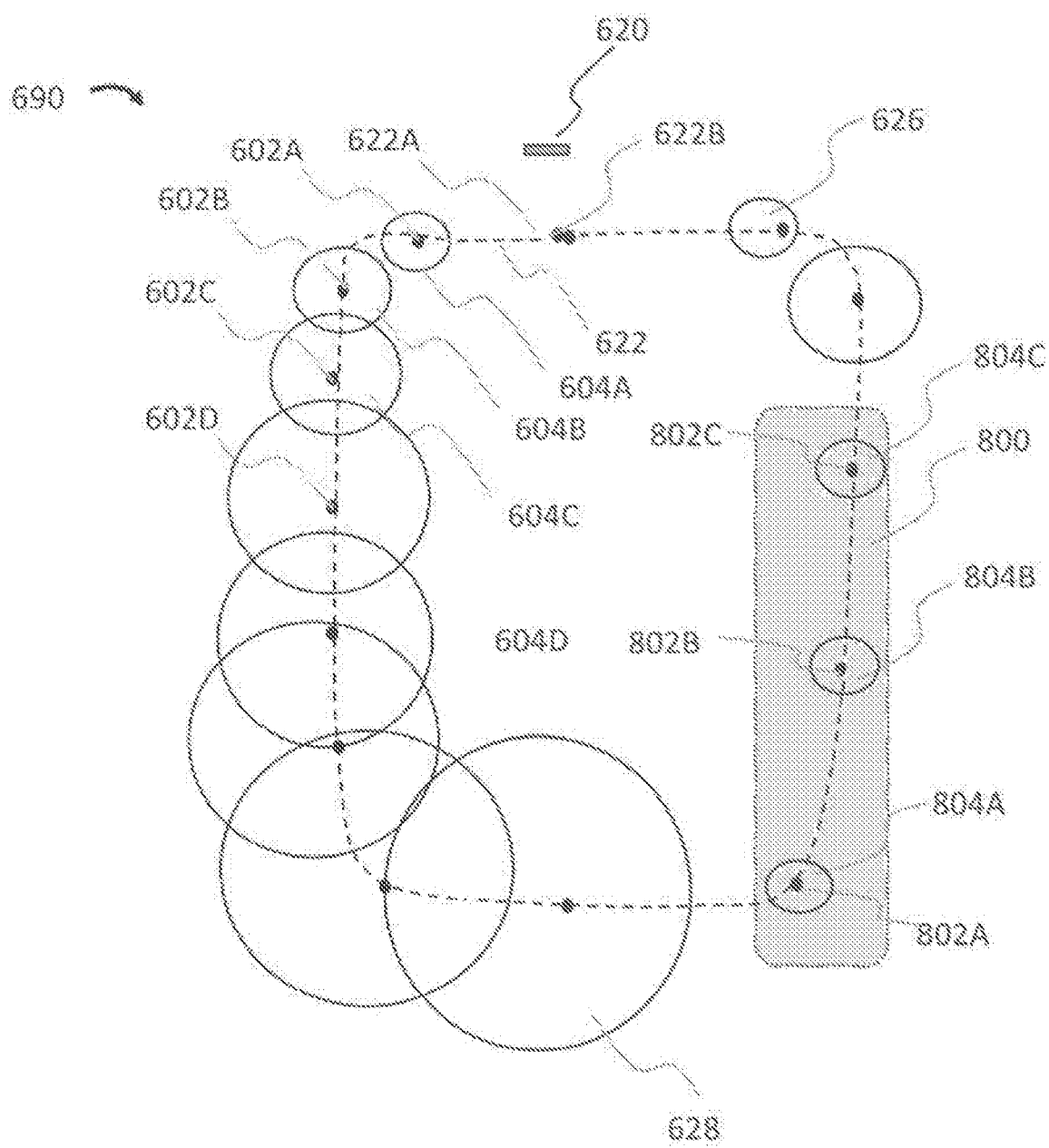
FIG. 8 illustrates an example result of a scan matching of an extended scan group on the graph illustrated in FIG. 6C in accordance with some implementations of the present disclosure.

In some cases, determining the confidence in the location of each node under block 558 of FIG. 5 can be performed by mapping and localization unit 262 and/or controller 254. FIG. 8 illustrates an example result of a scan matching of an extended scan group on the graph illustrated in FIG. 6C in accordance with some implementations of the present disclosure. Extended scan group 800 includes nodes 802A, 802B, and 802C. Because the scan matcher identified the positioning of nodes 802A, 802B, and 802C, their positions are determined with increased confidence. As a result, ranges 804A, 804B, and 804C may narrow, reflecting greater confidence. Accordingly, robot 202 can determine confidence based at least in part on scan matching, the propagation of errors (e.g., as reflected by ranges 602A, 602B, 602C, 602D, 626, and/or 628, and/or other ranges computed by robot 202), and/or other factors.

With the confidences determined, creating and solving a cost function to determine the location of each node under block 560 of FIG. 5 can be performed by mapping and localization unit 262 and/or controller 254. In some cases, one or more nodes of a graph can have conceptual springs (e.g., connections) that characterize the spatial relationship between the nodes and the confidence in that relationship (e.g., in a covariance and/or other statistical categorization). The confidence can be based at least in part on the ranges illustrated in FIGS. 6A-6C and 8.

Figure 9:
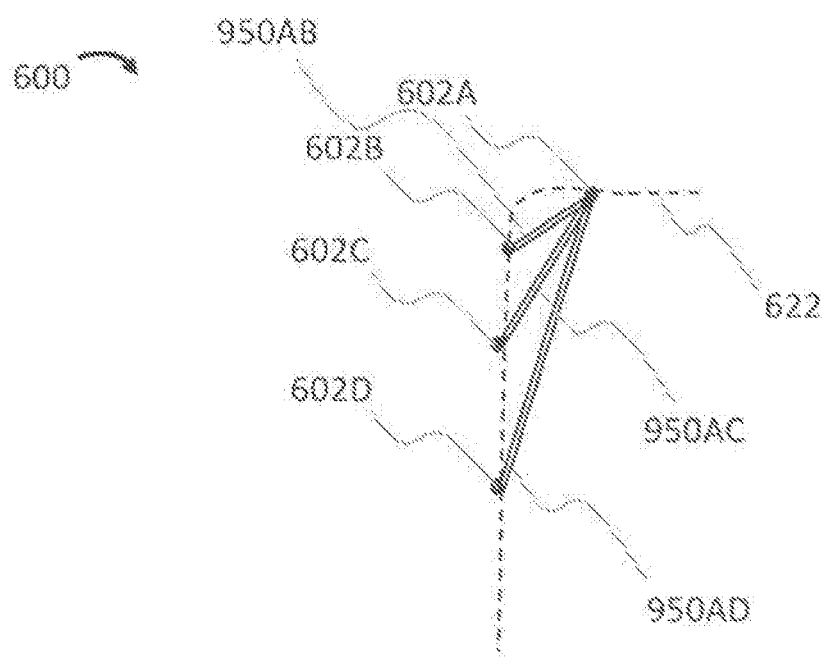
FIG. 9 illustrates springs to/from a node from the graph illustrated in FIG. 6A in accordance with some implementations of the present disclosure.

FIG. 9 illustrates springs to/from node 602A from graph 600 from FIG. 6A in accordance with some implementations of the present disclosure. As illustrated node 602A is connected to a plurality of nodes, including nodes 602B, 602C, and 602D by springs 650AB, 650AC, and 650AD. Node 602A can also be connected to any and/or all of the other nodes in the respective graph 600. However, in some cases, not all nodes of a map may be connected. Optionally, some nodes may be disconnected to prevent and/or mitigate the generation of unrealistic maps. For example, in some implementations, nodes can be selectively disconnected based at least in part on errors, exceeding a predetermined threshold uncertainty, being less than a predetermined threshold uncertainty, and/or any other predetermined constraints and/or restrictions.

Each of springs 950AB, 950AC, and 950AD can comprise one or more of: (1) a relative location between node 602A and the corresponding node at the other end (e.g., node 602D for spring 950AD, node 602C for spring 950AC, and node 602B for spring 950AB) and/or (2) a confidence of the relative positioning.

By way of illustration, the relative location can comprise a plurality of relative descriptions. In two-dimensions (e.g., such as those taken by a 2D scan), the relative location can comprise a horizontal direction, vertical direction, and/or an angle, such as in the form one or more of $\Delta x$, $\Delta y$, and $\Delta \theta$. Other ways of representing relative location are also contemplated, such as those with different coordinate systems and/or dimensions. For example, in three dimensions, relative location can be described in one or more of $\Delta x$, $\Delta y$, $\Delta z$, $\Delta \theta$, $\Delta r$, $\Delta \theta$, $\Delta \varphi$, etc. A person having ordinary skill in the art would appreciate that there are many ways to describe relative position and/or orientation in two, three, four, and/or any dimension. The confidence can be represented as a covariance matrix. By way of illustration, the covariance matrix can comprise the covariances between the elements of the location of the nodes (e.g., between node 602A and node 602D for spring 650AD, between node 602A and node 602C for spring 650AC, and between node 602A and node 602B for spring 650AB). In some implementations, confidence can also be represented with other statistical indicia known in the art, such as variances, sample variances, correlations, etc. The confidence can be dependent in part on ranges, such as ranges calculated with respect to FIGS. 6A-6C and 8.

In some cases, the springs can define a cost function, wherein optimizing a graph includes minimizing the potential energy of the system defined by the springs. In this way, finding the optimal map can also be described as minimizing the cost function and/or finding substantially the maximum likelihood position of each node (e.g., based on the probability distributions). Solving the cost function can utilize least-squares regression methods, non-linear least squares optimization, perturbation theory, weighted-least squares methods, Kalman Filters, and/or any other methods known in the art for solving the cost function. Substantially similar to physical springs, the equilibrium configuration is one where the net force on each node is equal to substantially zero and/or a local minimum lire springs can be represented as weights and/or orientations.

Once the position of the nodes in the graph (e.g., graph 600, 650, and/or 690, and/or any graph generated by robot 202), robot 202 can construct a map (e.g., map 300, 500A, and/or 500B, and/or any map generated by robot 202), such as by processing the graph with mapping and localization units 262.

Figure 10:
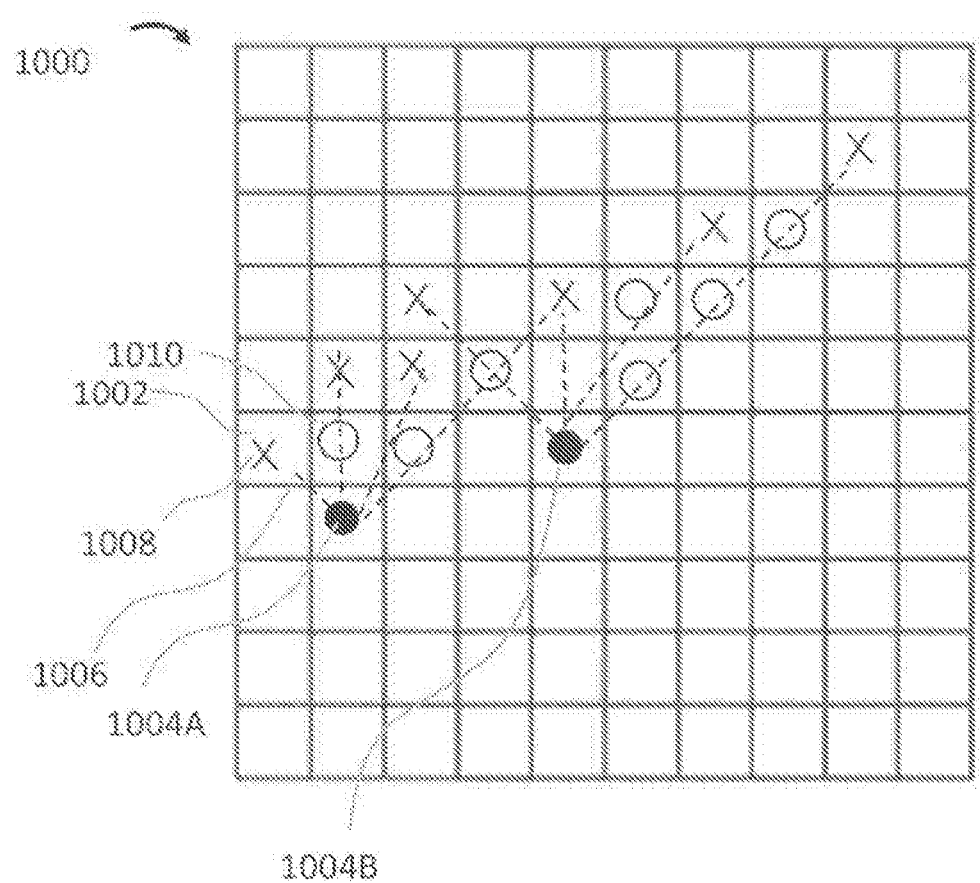
FIG. 10 is a diagram of the pixels of a map being constructed from scans in accordance to some implementations of this disclosure.

The rendering of a map from scans from the located nodes of block 562 of FIG. 5 can be performed by mapping and localization unit 262 and/or controller 254. For example, FIG. 10 is a diagram of the pixels of a map being constructed from scans in accordance to some implementations of this disclosure. By way of illustration, matrix 1000 comprises cells that correspond to locations on a map. In some cases, each cell can correspond to a pixel. Nodes 1004A and 1004B in cells in matrix 1000, indicative at least in part of the relative location of Nodes 1004A and 1004B. The locations can be based on standard units from a reference point and/or coordinate system (e.g., centimeters, meters, and/or any other standard measurement) and/or relative units (e.g., pixels, clicks, and/or any other relative measurement). Nodes 1004A and 1004B are provided for illustrative purposes. The positioning, number, and/or spacing of nodes can be dependent on the scans taken by robot 202 as it traversed an environment.

Each scan can provide information indicative at least in part of the relative location of objects around robot 202 at the nodes. In some cases, scans (e.g., scans from a scan LIDAR) can provide measurements to objects. For example, in some cases, ray tracing can be used, wherein the location of objects along rays extending from robot 202 across space can be used to identity the locations and/or orientations of objects. In matrix 1000, dotted lines such as line 1006 are indicative at least in part of rays. When an object is detected along a ray, the cell, such as cell 1002, can be marked. For visual illustration, mark 1008 is an "X" indicative at least in part that an object has been detected at the location corresponding to cell 1002.

In contrast, where a ray passes through a location with no object, the corresponding cell can be marked with an "O", such as illustrated with mark 1010. The cells corresponding to locations that rays have not passed through can have no mark Other designations are contemplated. A person having ordinary skill in the art would appreciate that cells can be marked in any way desired. Additionally, more information can be associated with each cell, such as by associating each cell to another data structure and/or using a data structure with more dimensions. For example, additional information such as the location of the route by robot 202, performance of actions and/or action-specific tasks, characteristics of an environment (e.g., water, carpet, reflective, and/or any other description), prohibited areas, and/or others can also be associated with one or more cells. Such additional information can be derived from scans (e.g., from sensors of sensor units 264) and/or derived separately and inserted into the map. Such additional information can be added in at this stage and/or later after map construction.

Accordingly, through the plurality of ray tracings that can be observed from scans, the location of objects seen by robot 202 at various nodes can be mapped. Together, the accumulation of scans from nodes can create the map. In some cases, there can be overlap between scans at nodes. In some cases, such overlapping scans can agree on the positioning of objects. However, in some cases, overlapping scans can disagree and provide conflicting information. In some cases, these can be due in errors in measurements and/or moving objects. Accordingly, probabilities can be assigned to an identified cell. In some cases, the probability can be computed as the number of scans that detected an object (or in some cases, the scans that did not detect an object) divided by the total number of scans. In this way Other statistics can be used as well, such as weighted averages, statistical tests, variances, and/or any other statistical method that reflects the uncertainty of conflicting information. In some cases, based on a predetermined statistical threshold, the presence and/or absence of objects can be determined in the map. For example, if the predetermined statistical threshold is met (either exceeded or not exceeded depending on how it is set), the location of the object will be filled in the generated map (e.g., maps 300, 500A, or 500B, and/or any other map generated by robot 202). By way of illustration, where the predetermined statistical threshold is a percentage, if the percentage of scans that identify an object in a location exceeds a predetermined percentage (e.g., 60, 70, 80, 90, and/or any other percentage based on the certainly desired), then the location will be identified as corresponding to an object in the map. As another illustration, in the case of identifying the absence of an object, if the percentage of scans that identify no object in a location exceeds a predetermined percentage (e.g., 60, 70, 80, 90, and/or any other percentage), then the location will be identified as no corresponding to an object (e.g., an empty space) in the map. A similar statistical analysis can be used in identifying any of the other/additional information described in this disclosure. A person having ordinary skill in the art would appreciate that the predetermined statistical thresholds can be defined in a number of ways, either in the positive (e.g., the presence of an object and/or characteristic) and/or the negative (e.g., the absence of an object and/or characteristic). Advantageously, taking a statistical approach can filter exit moving objects, which may only appear in some scans but not others.

In some implementations, additionally process can be performed on a map and/or graph. For example, in some cases, pixel states can be indicative at least in pan of whether robot 202 can navigate through an area. In some cases, certain locations may not have been adequately observed during demonstration, objects in the environment may have moved, and/or there can be uncertainty in measurements. Using user interface units 272, a user can edit a map and/or graph in order to add additional information. For example, a user can edit a map to identify areas in which robot 202 can traverse and/or areas in which robot 202 cannot traverse.

Robot 202 can learn from the users input. For example, robot 202 can store in memory 252 a library comprising one or more of: (i) original maps and/or graphs, (ii) maps and/or graphs with user input, (iii) other maps and/or graphs. In some cases, the library can be can contain approximately 1, 5, 10, 100, 1000, 10,000, 100,000, 1,000,000, 10,000,000, or any number of mays and/or graphs. In some implementations, the library can be stored in a network (e.g., cloud, server, etc.) and may not be saved within memory 252. The library can be used (e.g., based on machine learning algorithms) to train robot 202 to determine one or more associations between original maps/graphs and maps/graphs with user input. In this way, robot 202 can learn what changes have been made due to user input in the library and make substantially similar changes when it comes across substantially similar scenarios.

In some implementations, robot 202 can also made changes to existing graphs and/or maps during subsequent navigations in an environment. For example, robot 202 can collect additional data and/or scans in a new graph and/or map and use that additional data and/or scans to supplement an existing graph and/or map.

By way of illustration, robot 202 can, in a first period of time, generate a first graph and/or map beginning at a first home locator and traveling along a first route. At a later, second period of time, robot 202 can travel along a substantially similar path to the first route beginning at the first home locator and generating a second graph and/or map thereto, except collecting data (e.g., scans) that was not collected in the first period of time. Advantageously, where robot 202 started at the first home locator in the first period and the second period of time, robot 202 can use its localization to tie scans together from the first graph and/or map and the second graph and/or map. In this way, robot 202 can add additional coverage to the first graph and/or map that was measured in the second graph and/or map, and/or vice versa.

In some implementations, where different home locators are used as beginning points for the first graph and/or map and the second graph and/or map, robot 202 can transform them into a common coordinate system in order to more easily combine scans from each.

Figure 11:
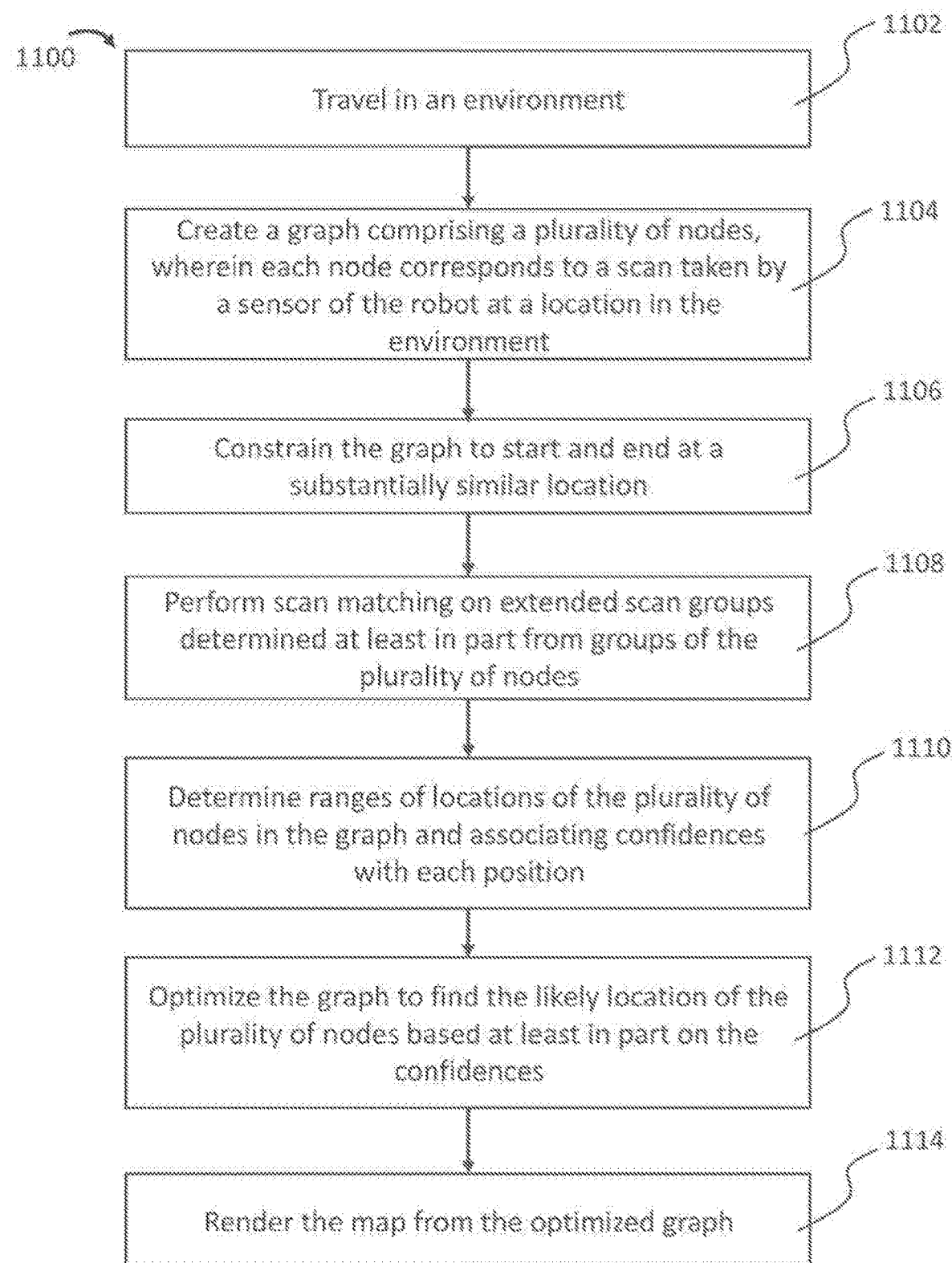
FIG. 11 is a process flow diagram of an exemplary method for generating a map by a robot in accordance with some implementations of the present disclosure.

FIG. 11 is a process flow diagram of an exemplary method 1100 for generating a map by a robot in accordance with some implementations of the present disclosure. Block 1102 includes traveling, by the robot, in an environment. Block 1104 includes creating a graph comprising a plurality of nodes, wherein each node corresponds to a scan taken by a sensor of the robot at a location in the environment. Block 1106 includes constraining the graph to start and end at a substantially similar location. Block 1108 includes performing scan matching on extended scan groups determined at least in part from groups of the plurality of nodes. Block 1110 includes associating a range of possible locations with each of the plurality of nodes based at least in part on the scan matching. Block 1112 includes determining confidences associated with each range of possible locations. Block 1114 includes optimizing the graph to find the likely location of the plurality of nodes based at least in part on the confidences. Block 1116 includes generating the map from the optimized graph.

Figure 12:
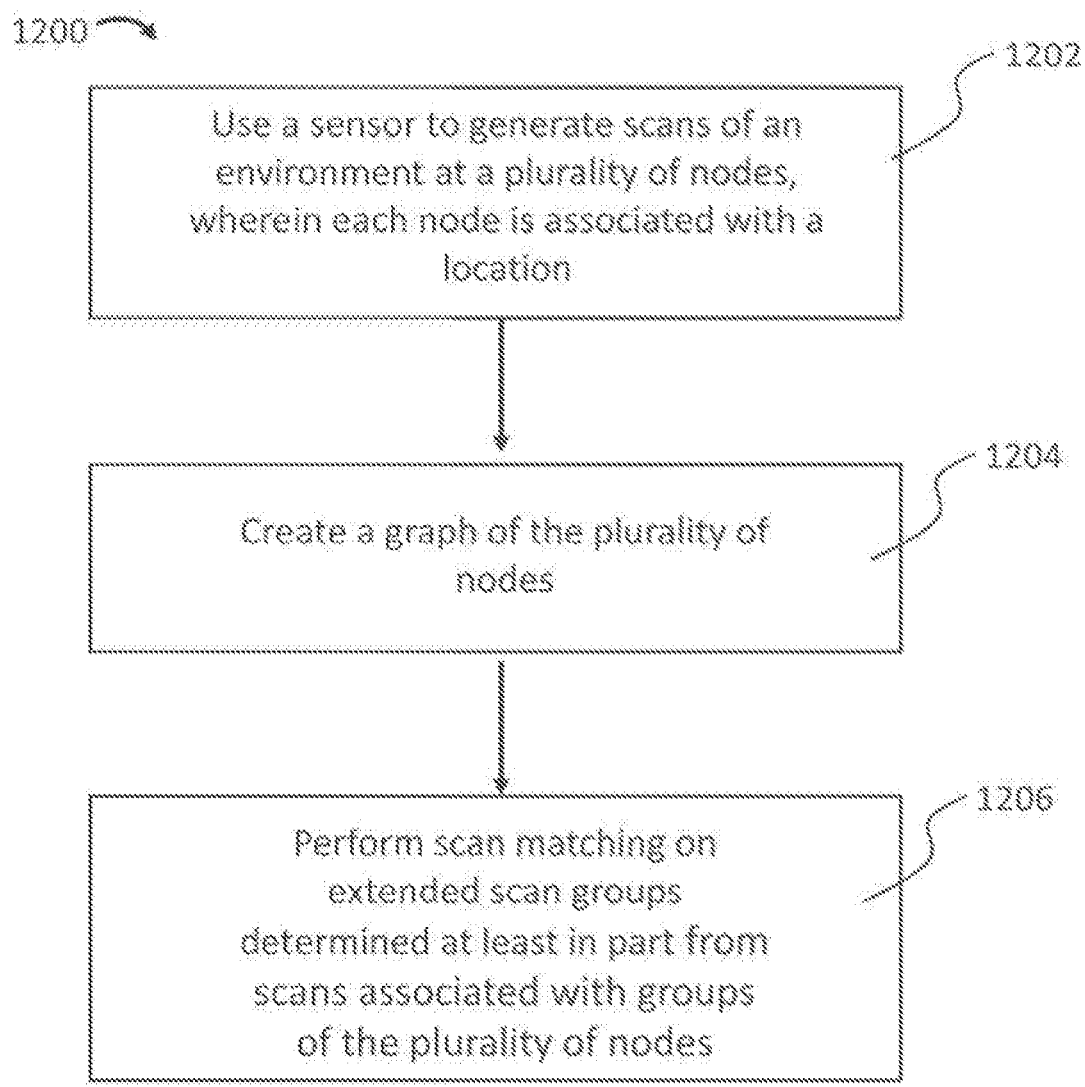
FIG. 12 is a process flow diagram of an exemplary method for operating a robot in accordance with some implementations of the present disclosure.

FIG. 12 is a process flow diagram of an exemplary method 1200 for operating a robot in accordance with some implementations of the present disclosure. Block 1202 includes causing a sensor to generate scans of an environment at a plurality of nodes, wherein each node of the plurality is associated with a location. Block 1204 includes creating a graph of the plurality of nodes based on the generated scans. Block 1206 includes determining extended scan groups based at least in part from scans associated with groups of the plurality of nodes. Block 1208 includes performing scan matching on the extended scan groups.

As used herein, computer and/or computing device can include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

As used herein, computer program and/or software can include any sequence or human or machine cognizable steps which perform a function. Such computer program and/or software may be rendered in any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., BREW), and the like.

As used herein, connection, link, transmission channel, delay line, and/or wireless can include a causal link between any two or more entities (whether physical or logical/virtual), which enables information exchange between the entities.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments can be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least," the term "such as" should be interpreted as "such as, without limitation;" the term "includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value. Also, as used herein "defined" or "determined" can include "predefined" or "predetermined" and/or otherwise determined values, conditions, thresholds, measurements, and the like.

What is claimed is:

1. A system for traveling a robot along a route, comprising:
    a memory having computer readable instructions stored thereon; and
    at least one processing device configurable to execute the computer readable instructions to,
        collect data by at least one sensor coupled to the robot as the robot travels along the route in an environment,
        generate a map of the environment and a route on the map in real-time, the map being generated concurrently with the collection of the data as the robot travels along the route in the environment, the map corresponding to a representation of the environment, the map including information directed to location and position of the robot along the route in the environment, the map being generated based on measurements taken by the at least one sensor at each one of a plurality of nodes along the route traveled by the robot, each one of the plurality of nodes comprising a range, the range of each one of the plurality of nodes being based on confidence measure at a respective node, and
        associate actions undertaken by the robot during traveling along the route with the location and position of the robot on the route on the map.

2. The system of claim 1, wherein the map is either a two-dimensional or three-dimensional representation of the environment, the map includes information directed to location and position of the robot along the route in the environment and obstacles detected by the at least one sensor in the environment.

3. The system of claim 1, wherein the at least one processing device is further configurable to execute the computer readable instructions to,
estimate distance traveled by the robot along the route based on revolution of wheels on the robot.

4. The system of claim 1, wherein the at least one processing device is further configurable to execute the computer readable instructions to,
estimate distance traveled by the robot along the route based on sequential images captured by the at least one sensor.

5. The system of claim 1, wherein the least one processing device is further configurable to execute the computer readable instructions to,
determine the robot returned to a start position based on detecting a home locator in the environment.

6. The system of claim 1, wherein the least one processing device is further configurable to execute the computer readable instructions to,
limit uncertainty of positioning of the plurality of nodes along the route traveled by the robot based on constraining start and end positions of the robot at a same point.

7. The system of claim 6, wherein each node of the plurality of nodes comprises an associated probabilistic distribution which corresponds to surrounding region around each node of the plurality of nodes.

8. The system of claim 1, wherein each one of the plurality of nodes along the route traveled by the robot corresponds to a probabilistic function or probabilistic distribution.

9. The system of claim 1, wherein each one of the plurality of nodes along the route traveled by the robot corresponds to position of the robot, the position of the robot is relative to either an initial location or one or more features in the environment.

10. The system of claim 1, wherein the range of each one of the plurality of nodes corresponds to a region around each one of the plurality of nodes such that each one of the plurality of nodes is located within the range.

11. The system of claim 1, wherein size of the range of each one of the plurality of nodes is variable based on confidence in location of each node of the plurality of nodes.

12. The system of claim 1, wherein the at least one processing device is further configurable to execute the computer readable instructions to,
selectively actuate one or more systems as the robot travels along the route, the one or more systems comprises a cleaning system, the cleaning system comprises one or more of water flow, brush, and vacuum cleaner.

13. A method for traveling a robot along a route, comprising:
collecting data by at least one sensor coupled to the robot as the robot travels along the route in an environment;
generating a map of the environment and a route on the map in real-time, the map being generated concurrently with the collection of the data as the robot travels along the route in the environment, the map corresponding to a representation of the environment, the map including information directed to location and position of the robot along the route in the environment, the map being generated based on measurements taken by the at least one sensor at each one of a plurality of nodes along the route traveled by the robot, each one of the plurality of nodes comprising a range, the range of each one of the plurality of nodes being based on confidence measure at a respective node; and
associating actions undertaken by the robot during traveling along the route with the location and position of the robot on the route on the map.

14. The method of claim 13, wherein the map is either a two-dimensional or three-dimensional representation of the environment, the map includes information directed to location and position of the robot along the route in the environment and obstacles detected by the at least one sensor in the environment.

15. The method of claim 13, further comprising:
estimating distance traveled by the robot along the route based on revolution of wheels on the robot.

16. The method of claim 13, further comprising:
estimating distance traveled by the robot along the route based on sequential images captured by the at least one sensor.

17. The method of claim 13, further comprising:
determining the robot returned to a start position based on detecting a home locator in the environment.

18. The method of claim 13, further comprising:
limiting uncertainty of positioning of the plurality of nodes along the route traveled by the robot based on constraining start and end positions of the robot at a same point.

19. The method of claim 18, wherein each node of the plurality of nodes comprises an associated probabilistic distribution which correspond to surrounding region around each node of the plurality of nodes.

20. The method of claim 13, wherein each one of the plurality of nodes along the route traveled by the robot corresponds to a probabilistic function or probabilistic distribution.

21. The method of claim 13, wherein each one of the plurality of nodes along the route traveled by the robot corresponds to position of the robot, the position of the robot is relative to either an initial location or one or more features in the environment.

22. The method of claim 13, wherein the range of each one of the plurality of nodes corresponds to a region around each one of the plurality of nodes such that each one of the plurality of nodes is located within the range.

23. The method of claim 13, wherein size of the range of each one of the plurality of nodes is variable based on confidence in location of each node of the plurality of nodes.

24. The method of claim 13, further comprising:
actuating one or more systems selectively as the robot travels along the route, the one or more systems comprises a cleaning system, the cleaning system comprises one or more of water flow, brush, and vacuum cleaner.

25. A non-transitory computer readable medium comprising computer readable instructions stored thereon that when executed by at least one processing device configure the at least one processing device to,
collect data by at least one sensor coupled to the robot as the robot travels along the route in an environment;
generate a map of the environment and a route on the map in real-time, the map being generated concurrently with the collection of the data as the robot travels along the route in the environment, the map corresponding to a representation of the environment, the map including information directed to location and position of the robot along the route in the environment, the map being generated based on measurements taken by the at least one sensor at each one of a plurality of nodes along the route traveled by the robot, each one of the plurality of nodes comprising a range, the range of each one of the plurality of nodes being based on confidence measure at a respective node; and associate actions undertaken by the robot during traveling along the route with the location and position of the robot on the route on the map.

26. The non-transitory computer readable medium of claim 25, wherein the map is either a two-dimensional or three-dimensional representation of the environment, the map includes information directed to location and position of the robot along the route in the environment and obstacles detected by the at least one sensor in the environment.

27. The non-transitory computer readable medium of claim 25, wherein the at least one processing device is further configurable to execute the computer readable instructions to, estimate distance traveled by the robot along the route based on revolution of wheels on the robot.

28. The non-transitory computer readable medium of claim 25, wherein the at least one processing device is further configurable to execute the computer readable instructions to, estimate distance traveled by the robot along the route based on sequential images captured by the at least one sensor.

29. The non-transitory computer readable medium of claim 25, wherein the at least one processing device is further configurable to execute the computer readable instructions to, determine the robot has returned to a start position based on detecting a home locator in the environment.

30. The non-transitory computer readable medium of claim 25, wherein the at least one processing device is further configurable to execute the computer readable instructions to, limit uncertainty of positioning of the plurality of nodes along the route traveled by the robot based on constraining start and end positions of the robot at a same point.

31. The non-transitory computer readable medium of claim 30, wherein each node of the plurality of nodes include an associated probabilistic distribution which correspond to surrounding region around each node of the plurality of nodes.

32. The non-transitory computer readable medium of claim 25, wherein each one of the plurality of nodes along the route traveled by the robot corresponds to a probabilistic function or probabilistic distribution.

33. The non-transitory computer readable medium of claim 25, wherein each one of the plurality of nodes along the route traveled by the robot corresponds to position of the robot, the position of the robot is relative to either an initial location or one or more features in the environment.

34. The non-transitory computer readable medium of claim 25, wherein the range of each one of the plurality of nodes corresponds to a region around each one of the plurality of nodes such that each one of the plurality of nodes is located within the range.

35. The non-transitory computer readable medium of claim 25, wherein size of the range of each one of the plurality of nodes is variable based on confidence in location of each node of the plurality of nodes.

36. The non-transitory computer readable medium of claim 25, wherein the at least one processing device is further configurable to execute the computer readable instructions to, selectively actuate one or more systems as the robot travels the route, the one or more systems comprises a cleaning system, the cleaning system comprises one or more of water flow, brush, and vacuum cleaner.

* * * * *